(12) United States Patent
Jyo et al.

(10) Patent No.: US 8,844,854 B2
(45) Date of Patent: Sep. 30, 2014

(54) ELECTRIC FISHING REEL

(75) Inventors: Hideki Jyo, Higashikurume (JP);
Tomoyuki Amano, Tokorozawa (JP);
Sakae Kobayashi, Tokyo (JP);
Harunobu Kusumoto, Higashikurume (JP)

(73) Assignee: Globeride, Inc., Tokyo (JP)

( * ) Notice: Subject to any disclaimer, the term of this patent is extended or adjusted under 35 U.S.C. 154(b) by 259 days.

(21) Appl. No.: 13/455,546

(22) Filed: Apr. 25, 2012

(65) Prior Publication Data

US 2013/0026276 A1 Jan. 31, 2013

(30) Foreign Application Priority Data

Apr. 26, 2011 (JP) ................................. 2011-097845

(51) Int. Cl.
*A01K 89/01* (2006.01)
*A01K 89/017* (2006.01)

(52) U.S. Cl.
CPC .................................... *A01K 89/017* (2013.01)
USPC ............................ 242/253; 242/250; 242/257

(58) Field of Classification Search
CPC .................................................... A01K 89/017
USPC ........................................ 242/250, 253, 257
See application file for complete search history.

(56) References Cited

U.S. PATENT DOCUMENTS

| | | | | |
|---|---|---|---|---|
| 4,021,003 A | * | 5/1977 | Watkins | 242/250 |
| 5,556,047 A | * | 9/1996 | Nanbu | 242/250 |
| 5,954,285 A | * | 9/1999 | Whisenhunt | 242/250 |
| 6,012,665 A | * | 1/2000 | Olona | 242/250 |
| 7,165,737 B2 | | 1/2007 | Nakagawa et al. | |
| 7,398,939 B2 | * | 7/2008 | Terauchi et al. | 242/250 |

FOREIGN PATENT DOCUMENTS

| | | |
|---|---|---|
| JP | 10-337138 | 12/1998 |
| JP | 2000-316437 | 11/2000 |
| JP | 2001-169700 | 6/2001 |
| JP | 2001-169701 | 6/2001 |
| JP | 2002-186391 | 7/2002 |
| JP | 2002-272332 | 9/2002 |
| JP | 2003-092959 | 4/2003 |
| JP | 2004-081152 | 3/2004 |
| JP | 2006-230359 | 9/2006 |
| JP | 2007-252256 | 10/2007 |

OTHER PUBLICATIONS

Japanese Office Action dated Feb. 13, 2014 for Appln. No. 2011-097845.

* cited by examiner

*Primary Examiner* — Emmanuel M Marcelo
(74) *Attorney, Agent, or Firm* — Pillsbury Winthrop Shaw & Pittman, LLP

(57) ABSTRACT

An electrically powered reel for fishing is presented, which enables the operator to perform a series of sounding operations smoothly and quickly and has superior graspability and holdability as well. The electrically powered reel for fishing includes: a spool which is provided between left and right side plates and of a main body of the reel, and around which a fishing line is wound; a drive motor which is provided in the main body of the reel and rotates and drives the spool; and an operation member which adjusts a power of the drive motor. In addition, when a space between an operation portion of the operation member and an operation portion of a clutch-OFF switching member is connected by a virtual shortest straight line, each component member of the reel is arranged so as to avoid the virtual straight line.

8 Claims, 36 Drawing Sheets

ELECTRIC FISHING REEL

CROSS REFERENCE TO RELATED APPLICATIONS

This application claims priority to copending Japanese Application No. 2011-097845, filed Apr. 26, 2011. The entire contents of which are incorporated herein in their entirety by reference.

FIELD OF THE INVENTION

The present invention relates to an electrically powered reel for fishing.

DESCRIPTION OF THE RELATED ART

Many conventional electrically powered reels for fishing have had a structure which enables an operator to perform operations of ejecting a fishing tackle to winding up can be carried out in such a state that a fishing rod is placed on a fishing rod holder mounted on a gunwale, so as to be mainly applied to fishing for a deep place, but in recent years, there are known electrically powered reels having a devised structure which enables the operator to perform the operations in such a state that the fishing rod is supported by hand.

For instance, structures are known in which an operation member for winding a spool of an electrically powered reel for fishing (continuously varying motor power) is arranged in various positions. For instance, Japanese Patent Laid-Open No. 2001-169700 (hereafter referred to as "Patent Document 1") discloses an electrically powered reel in which a rotary operation member is rotatably supported between left and right side plates behind a main body of the reel in the front-rear direction, or an electrically powered reel in which a sliding type of operation member is supported movably in the left-right directions behind a counter case. In addition Japanese Patent Laid-Open No. 2003-92959 (hereafter referred to as "Patent Document 2") discloses a structure in which a part of a discoidal rotation knob (operation member) is exposed to the upper face of a control case, the knob is rotated while being pushed by the thumb from an upper side, and thereby a motor power is continuously varied.

CITATION LIST

Patent Literature

Patent Literature 1: Japanese Patent Laid-Open No. 2001-169700.
Patent Literature 2: Japanese Patent Laid-Open No. 2003-92959.

As described above, recently, such a type of an electrically powered reel as to be capable of being operated in a state of being supported by hand is also desired for the electrically powered reels for fishing, similarly to a reel for fishing (bait casting) which is used for lure fishing, but as for a conventional electrically-powered reel for fishing, in which the arrangement of an operation member for adjusting the motor power is devised, there is a room to be further improved in respect of operability. Specifically, the electrically powered reels for fishing are desirably structured so that not only an operation of simply raising and lowering the fishing tackle is performed speedily, but also an operation of intensively sounding a shelf in which fish exists (for instance, 5 to 15 m from sea bottom) can be performed smoothly and quickly.

Usually, such an operation of sounding the shelf is performed by repeating: "(1) operation of winding the fishing tackle at a low speed" from a lower layer region of a shelf in which fish exists, and "(2) operation of dropping the fishing tackle to the lower layer region of the shelf by turning the clutch OFF" in a stage at which the fishing tackle has come to an upper region of the shelf. (Such operation is hereafter referred to as "sounding operation".) For information, the above described operation (1) is also performed occasionally while an operation of luring fish or a heaving operation (including operation of winding up with drive motor and operation of flapping rod) is performed, and the above described operation (2) is also performed occasionally while a falling speed is adjusted by a thumbing operation. It is important to perform these series of "sounding operation" smoothly and quickly. In addition, the main body of the reel is also required to have adequate graspability and holdability, when the nibble is sensed while such a sounding operation is performed, an operation of matching time with the nibble is performed, and subsequently a fight with fish starts.

However, it is difficult to perform these series of sounding operations in the state of supporting the rod by hand, while using the above described conventional type of electrically powered reel for fishing. In other words, in structures disclosed in Patent Document 1, it is difficult to smoothly perform the above described operations of (1) to (2), because a member which disturbs a movement of a hand is arranged between an operation member for adjusting a motor power and a clutch-OFF member (because upper part of right frame disturbs movement of hand in the shortest distance), in any structure. When the above described sounding operation is performed, an operating finger occasionally leaves from a central region in a left-right direction of a main body of the reel, and a grasping and holding state results in being lowered remarkably during the period. In addition, a structure disclosed in Patent Document 2 also has a similar problem, and further has a problem that a wall part behind the counter case disturbs the movement of a finger toward an operation member and other sites.

In an embodiment of the present invention, an electrically powered reel for fishing is provided which can perform a series of sounding operations smoothly and quickly.

SUMMARY

An electrically powered reel for fishing according to one aspect of the present invention includes: a spool which is provided between left and right side plates of a main body of the reel, and around which a fishing line is wound; a drive motor which is provided in the main body of the reel and rotates and drives the spool; an operation member which adjusts a power of the drive motor; and a clutch-OFF switching member which switches and operates the spool to a free rotation state from a fishing line winding state, wherein when a space between an operation portion of the operation member and an operation portion of the clutch-OFF switching member is connected by a virtual shortest straight line, each component member of the reel is arranged so as to avoid the virtual straight line.

In the case of the electrically powered reel for fishing having the above described structure, when an operator moves the finger to an operation portion of a clutch-OFF switching member from an operation portion of an operation member, in the state of performing a sounding operation, the operator can move the finger linearly without being disturbed by the component member of the main body of the reel, and accordingly can smoothly and quickly perform the operation of dropping the fishing tackle from a fishing line winding-up state.

In this case, in the above described structure, the operation portion of the operation member and the operation portion of the above described clutch-OFF switching member are supported so as to be movable with respect to the main body of the reel, and operation regions (regions on which finger can abut) in the respective operation portions are structured so as to have a certain degree of width and length. For this reason, a relationship between a position of the operation portion of the operation member in such a state that a fishing line is wound (position of operation portion when a drive motor is stopped), and a position of the operation portion of the clutch-OFF switching member (position of operation portion in clutch-ON state) becomes important. The above described virtual straight line means all lines obtained by connecting both of the operation portions with a shortest distance, within a range of positions on which a finger actually abuts, and in detail, in which operations can be performed by abutting of the finger, in each of the operation portions. The component member which disturbs the movement of the finger may not exist therebetween. Specifically, the component member of the main body of the reel may be structured so as not to exist on the straight lines, when all ranges in the region in which the operation can be performed when the above described clutch-OFF switching member is in an ON position are connected with all ranges in the region in which the operation can be performed when the above described operation member is in a stopping position for the drive motor, by the shortest distance (straight line having no curve). In other words, if the reel is structured so as to satisfy such a relationship, any obstacle does not exist when the finger is moved from the operation portion of the operation member to the clutch-OFF switching member, in such a state that the sounding operation is performed by a general operation form of the finger, which accordingly enables the operation of moving the finger to be smoothly and quickly performed. Furthermore, such a structure does not need the finger to be largely moved, and accordingly does not degrade the graspability and holdability of the main body of the reel.

The embodiment of the present invention provides an electrically powered reel for fishing, by which a series of the sounding operation can be smoothly and quickly performed in a state of being supported by hand.

BRIEF DESCRIPTION OF THE DRAWINGS

FIG. 23(A) is a plan view illustrating a control case portion; FIG. 23(B) is a sectional view taken along the line C-C of FIG. 23(A); and FIG. 23(C) is a side view of the operation member;

FIG. 24(A) is a plan view illustrating the control case portion; FIG. 24(B) is a sectional view taken along the line D-D of FIG. 24(A); and FIG. 24(C) is a side view of the operation member;

FIG. 25(A) is a plan view illustrating the control case portion; FIG. 25(B) is a sectional view taken along the line E-E of FIG. 25(A); and FIG. 25(C) is a side view of the operation member;

REFERENCE SIGNS LIST

Detailed Description of the Preferred Embodiments

Figure 1:
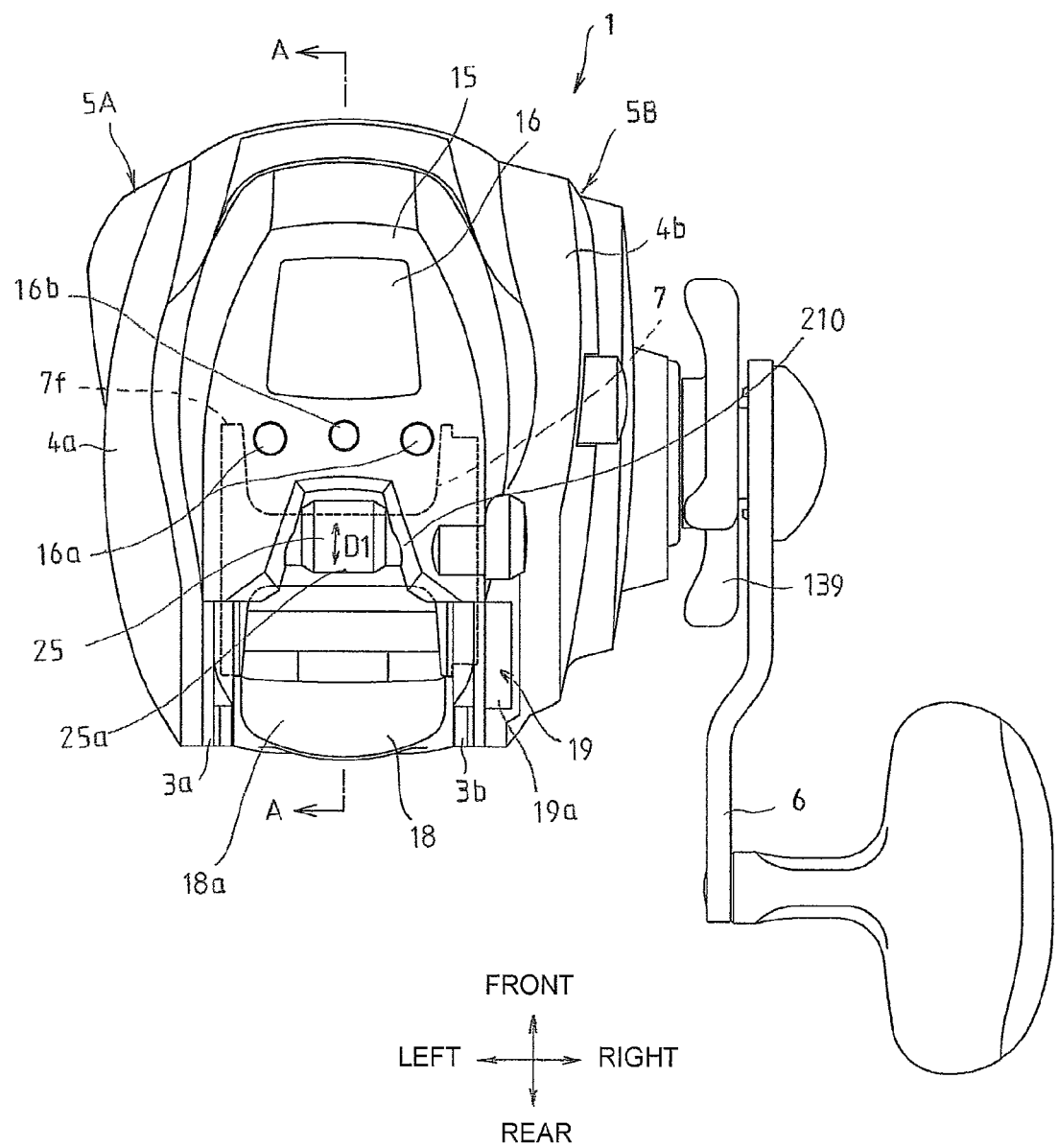
FIG. 1 is a plan view of an electrically powered reel for fishing according to a first embodiment of the present invention.
Figure 2:
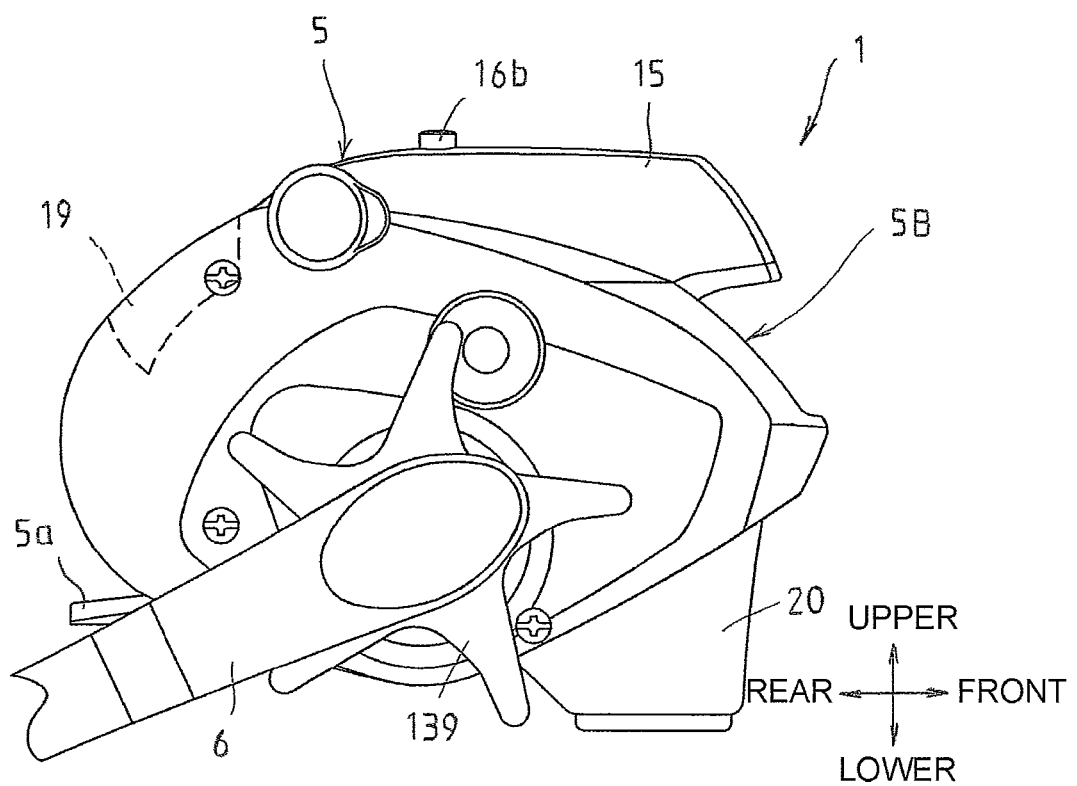
FIG. 2 is a side view of the electrically powered reel for fishing illustrated in FIG. 1, which is viewed from a handle side.
Figure 3:
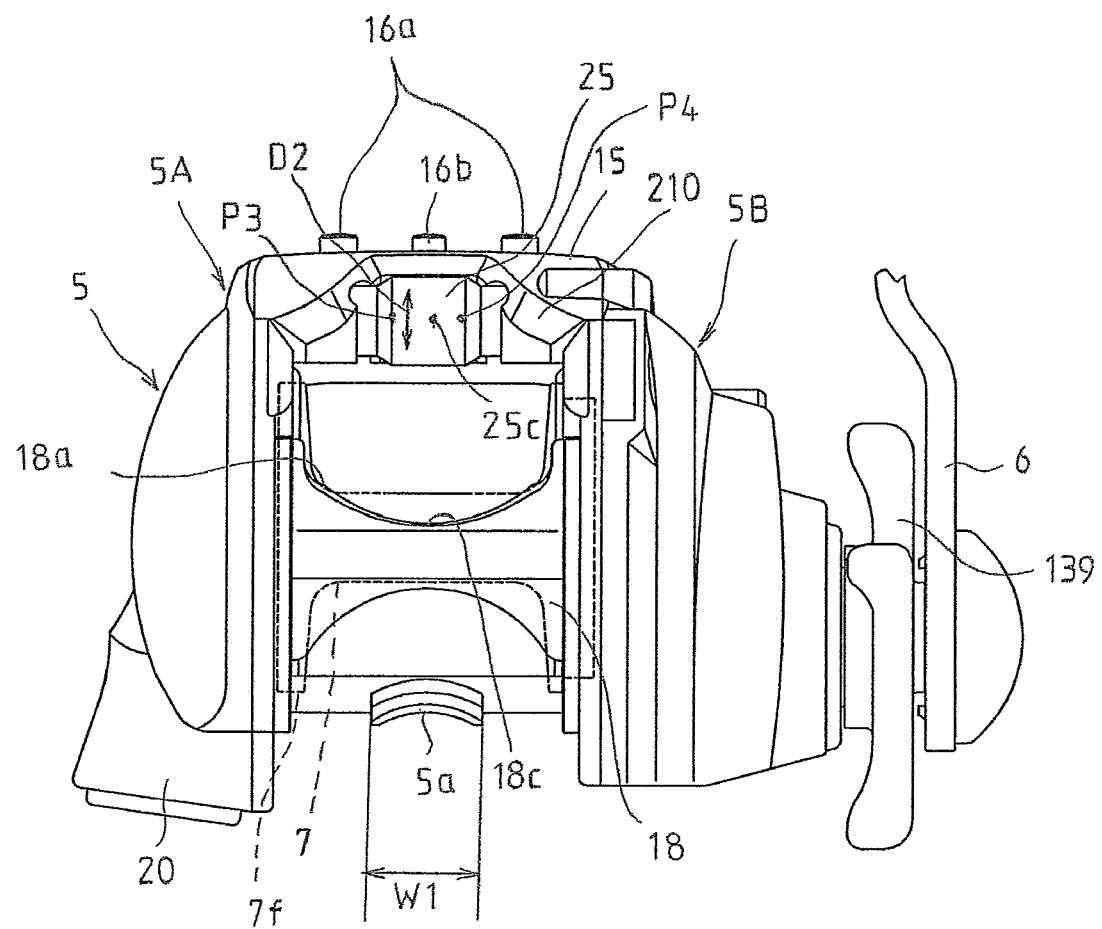
FIG. 3 is a rear view of the electrically powered reel for fishing illustrated in FIG. 1, which is viewed from a rear side.
Figure 4:
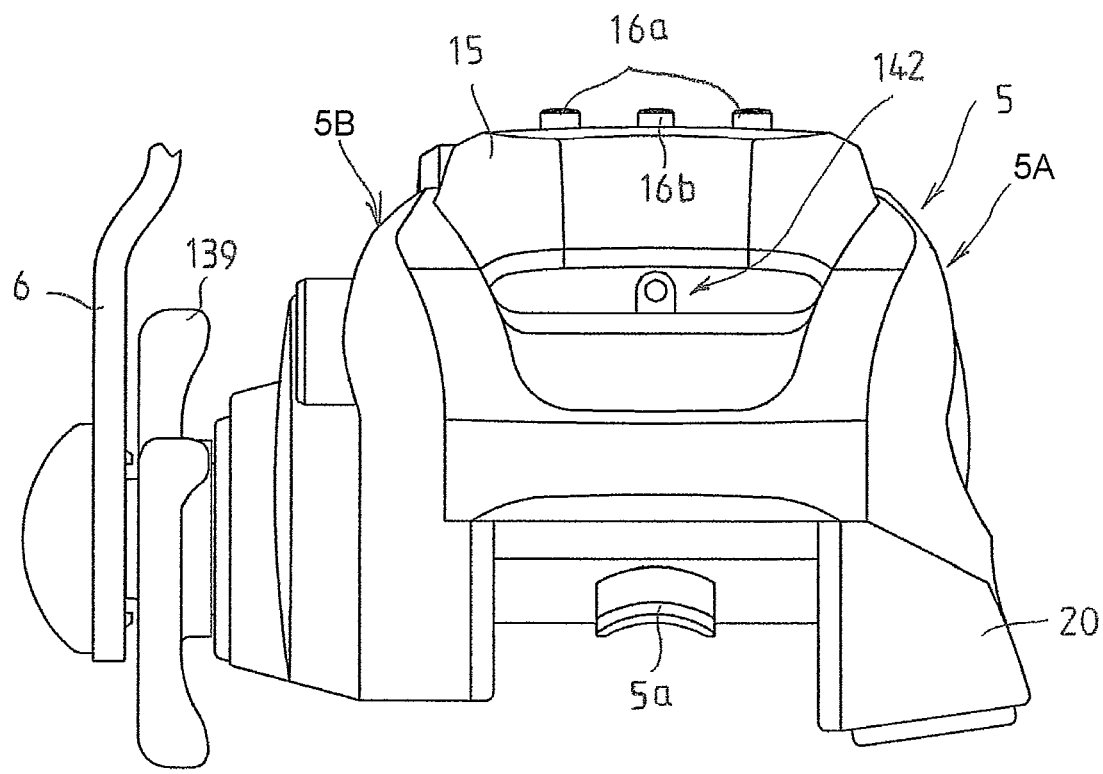
FIG. 4 is a front view of the electrically powered reel for fishing illustrated in FIG. 1, which is viewed from a front side.
Figure 5:
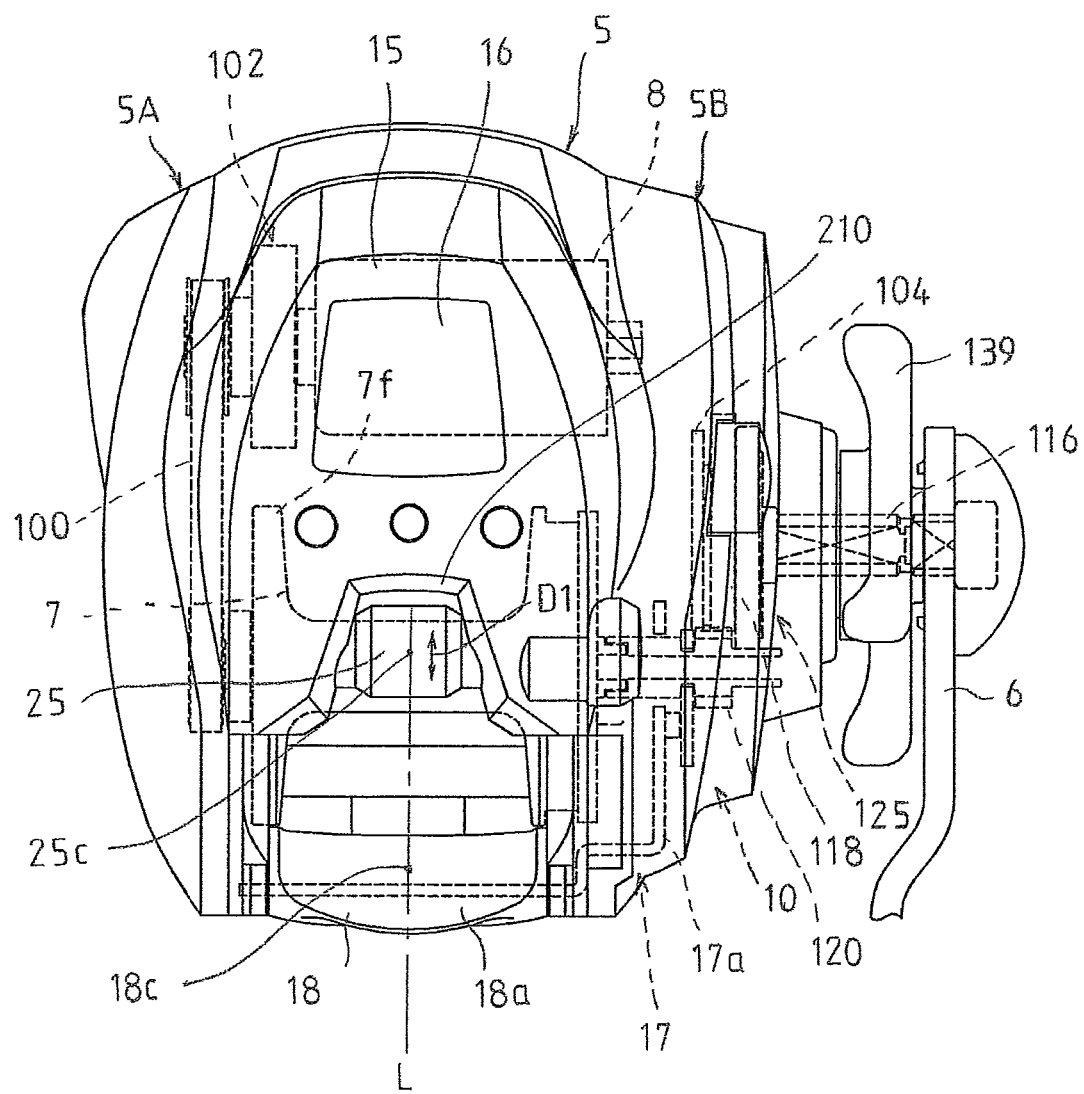
FIG. 5 is a plan view of the electrically powered reel for fishing illustrated in FIG. 1, in which an internal mechanism is partially illustrated.
Figure 6:
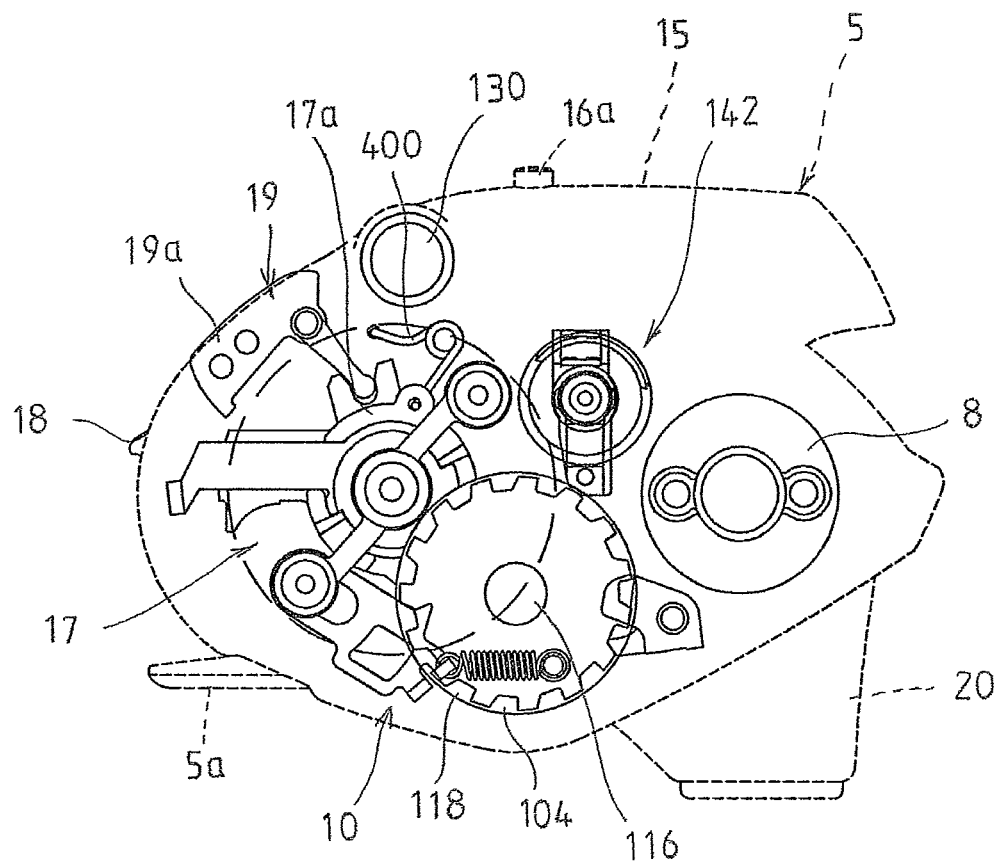
FIG. 6 is a schematic view of the internal driving mechanism of the electrically powered reel for fishing illustrated in FIG. 1, which is viewed from a side part.
Figure 7:
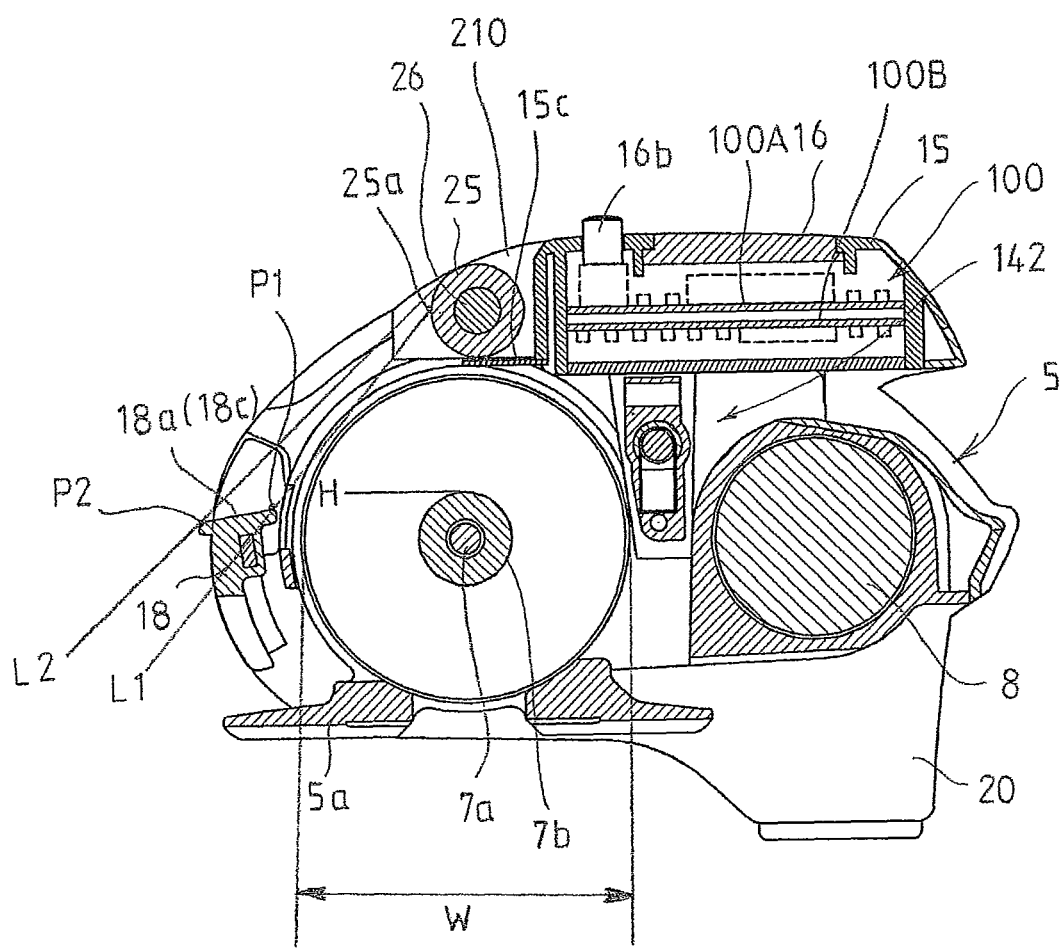
FIG. 7 is a sectional view taken along the line A-A of FIG. 1.
Figure 8:
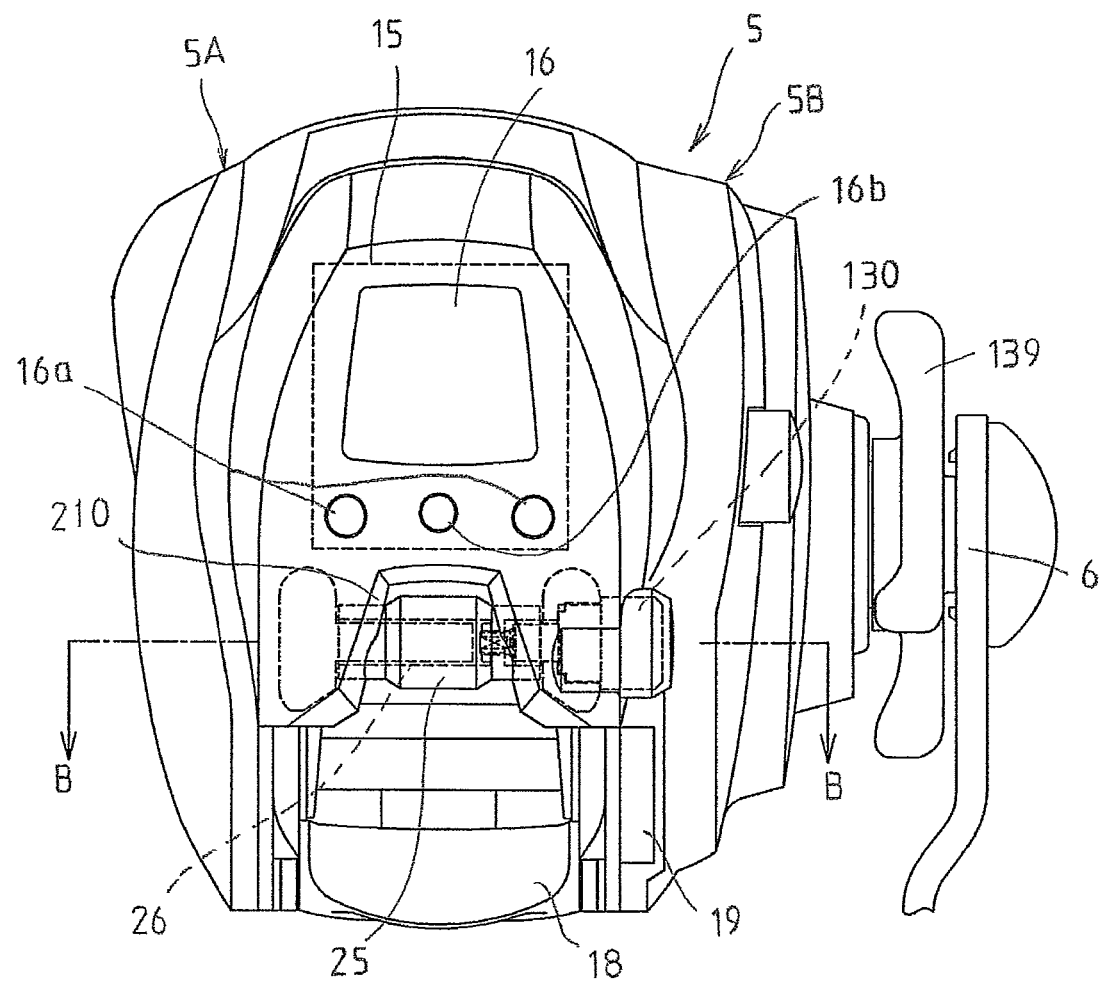
FIG. 8 is a plan view of the electrically powered reel for fishing illustrated in FIG. 1, which illustrates the arrangement form of an operation portion mechanism including an operation member, an angle sensor, and a support member for supporting the operation member and the angle sensor.
Figure 9:
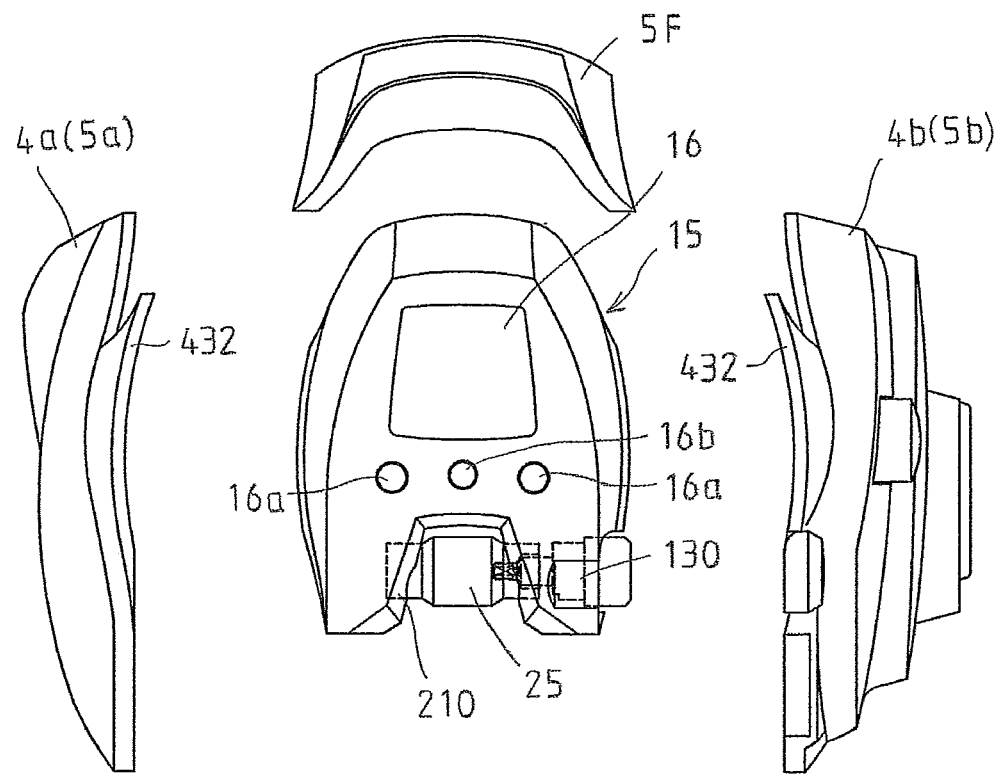
FIG. 9 is an exploded view of a control case and side plates of a main body of the reel.
Figure 10:
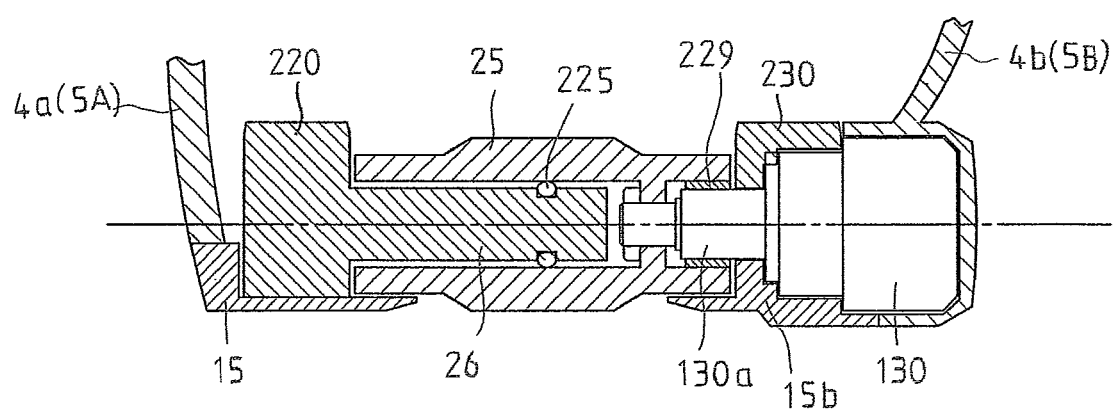
FIG. 10 is a sectional view taken along the line B-B of FIG. 8.
Figure 11:
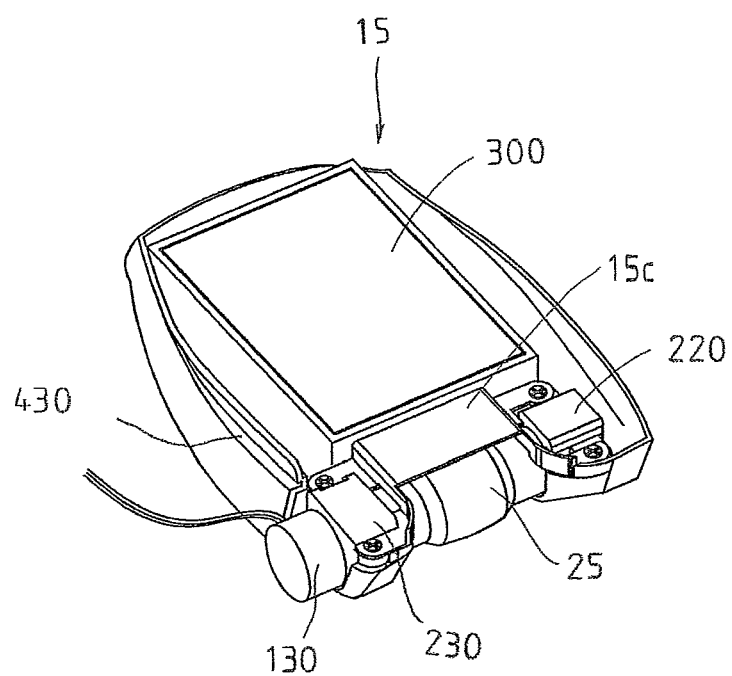
FIG. 11 is a perspective view of the vicinity of the control case, which illustrates an arrangement relationship between the operation portion mechanism and a control section of the control case and the like, and is viewed from a back side (lower side)

Embodiments of an electrically powered reel for fishing according to the present invention will be described below with reference to the drawings. FIG. 1 to FIG. 11 are views for illustrating a first embodiment of the present invention; FIG. 1 is the plan view; FIG. 2 is the side view which is viewed from a handle side; FIG. 3 is the rear view which is viewed from a rear side; FIG. 4 is the front view which is viewed from a front side; FIG. 5 is the plan view in which an internal mechanism is partially illustrated; FIG. 6 is the schematic view in which the internal driving mechanism is viewed from a side part; FIG. 7 is the sectional view taken along the line A-A of FIG. 1; FIG. 8 is the plan view illustrating the arrangement form of an operation portion mechanism including an operation member, an angle sensor, and a support member for supporting the operation member and the angle sensor; FIG. 9 is the exploded view of a control case and side plates of a main body of the reel; FIG. 10 is the sectional view taken along the line B-B of FIG. 8; and FIG. 11 is the perspective view of the vicinity of the control case illustrating an arrangement relationship between the operation portion mechanism and a control section of the control case and the like, which is viewed from the back side (lower side).

Incidentally, in the following description, a front-rear direction, a left-right direction and an upper-lower direction are defined as directions described in FIG. 1 and FIG. 2.

In the present disclosure, an operation of adjusting the amount of a fishing line ejected from a spool per unit time by pressing the spool with a finger (for instance, a thumb) is referred to as "thumbing" or "thumbing operation".

As is illustrated in FIG. 1, an electrically powered reel 1 for fishing according to the present embodiment has a main body 5 of the reel, which includes left and right side plates 5A and 5B that are structured so as to mount left and right covers 4a and 4b on left and right frames 3a and 3b. A manual handle 6 that is operated for winding is provided in one side plate (right side plate 5B) which constitutes the main body 5 of the reel, and a spool 7 around which the fishing line is wound is supported rotatably around a spool shaft 7a (see FIG. 7) between the left and right side plates 5A and 5B. In addition, in the present embodiment, as is illustrated in FIG. 5 to FIG. 7, a drive motor 8 is held between the left and right side plates 5A and 5B in the front side of the spool 7, and the spool 7 is rotationally driven in a direction of winding the fishing line by the winding operation of the manual handle 6 and the rotational driving of the drive motor 8, through a power transmission mechanism 10 (see FIG. 5).

Incidentally, the drive motor 8 may be structured so as to be installed in the inner part of the spool 7, but is installed in the front part of the spool 7, as in the present embodiment. Thereby, it is enabled to downsize the main body 5 of the reel as much as possible, while securing the amount of the fishing line to be wound around the spool 7. In addition, the power transmission mechanism 10 can be structured by a known mechanism provided with a function (achieved by a reduction mechanism 102, a transmission belt 100 (see FIG. 5) and the like) of reducing a rotational driving force of the drive motor 8 and transmitting the force to the spool 7 side, a function of making the manual handle 6 not to rotate together even when the drive motor 8 rotationally has driven the spool, a function of preventing the reverse rotation of the manual handle 6 (including ratchet 104) and the like. In addition, such a power transmission mechanism 10 may be arranged in the left side plate 5A side, may be arranged in the right side plate 5B side or may be arranged in each of the left and right side plates while being divided thereto. Incidentally, in the figures (particularly, in FIG. 5), a reference numeral 116 denotes a handle shaft coupled with a handle 6, a reference numeral 118 denotes a drive gear which is rotatably supported by the handle shaft 116, and a reference numeral 120 denotes a pinion engaged with the drive gear 118. These components constitute the above described power transmission mechanism 10. In addition, in the figures, a reference numeral 125 denotes a known drag mechanism of imparting a drag force to the rotation of the spool 7 when the fishing line is unwound from the spool 7 in fishing, and a star-shaped drag adjustment knob (star drag) 139 for adjusting the drag force with the drag mechanism 125 is provided between the main body 5 of the reel and the handle 6.

In addition, a known level-wind mechanism 142 (see FIG. 6 and FIG. 7) provided with a function of uniformly winding the fishing line with respect to the spool 7 is installed between the left and right side plates 5A and 5B in the front part of the spool 7. Furthermore, a box-shaped control case 15 which has accommodated a control section 100 therein (having control substrates 100A and 100B) for controlling the drive motor 8 is arranged in the upper part of the spool 7 between the left and right side plates 5A and 5B that constitute the main body 5 of the reel. As is illustrated in FIG. 11, this control case 15 has groove portions (illustrated in only one side) 430 in one part of the outer faces of both side walls, peripheral edges 432 (see FIG. 9) of the left and right side plates 5A and 5B are engaged with these groove portions 430 so as to be engaged with/ disengaged from the groove portions 430, and a front cover 5F which constitutes the main body of the reel is mounted in the front part of the peripheral edges 432. Thereby, the control case 15 is mounted on the main body 5 of the reel. In addition, in this mounting state, the surface of the control case 15 becomes flush with the surfaces of the left and right side plates 5A and 5B and the front cover 5F. Incidentally, the control case 15 of the present embodiment has a length dimension in the front-rear direction set to be longer than a length dimension in the left-right direction.

In addition, the main body 5 of the reel has a known clutch mechanism 17 arranged therein (see FIG. 5 and FIG. 6), which switches the spool 7 between a fishing line winding state and a free rotation state, by moving the above described pinion 120 in the axial direction. This clutch mechanism 17 is provided with a function of transmitting/intercepting the power transmitted from the manual handle 6 and the drive motor 8 through the power transmission mechanism 10, and is installed in the right side plate 5B side in the present embodiment. With the clutch plate 17a which constitutes this clutch mechanism 17, as is illustrated in FIG. 1, a clutch-OFF switching member 18 for switching the power transmission from an ON state to an OFF state and a clutch-ON switching member 19 for switching the power transmission from the OFF state to the ON state are engaged.

The clutch-OFF switching member 18 in the present embodiment is structured so as to be bridged between the left and right side plates 5A and 5B in the rear side of the spool 7, in order that the spool 7 can be operated while being thumbed; and is structured so as to switch the clutch mechanism 17 from the ON state to the OFF state, by mounting a thumb on the operation portion 18a which is the surface of the switching member, and operating the operation portion 18a so as to push it down, from the state illustrated in FIG. 7. This clutch-OFF switching member 18 is distributed and held between the clutch ON position and the clutch-OFF position (not-shown) illustrated in FIG. 7, by a distributing and holding spring 400 illustrated in FIG. 6.

Figure 14:
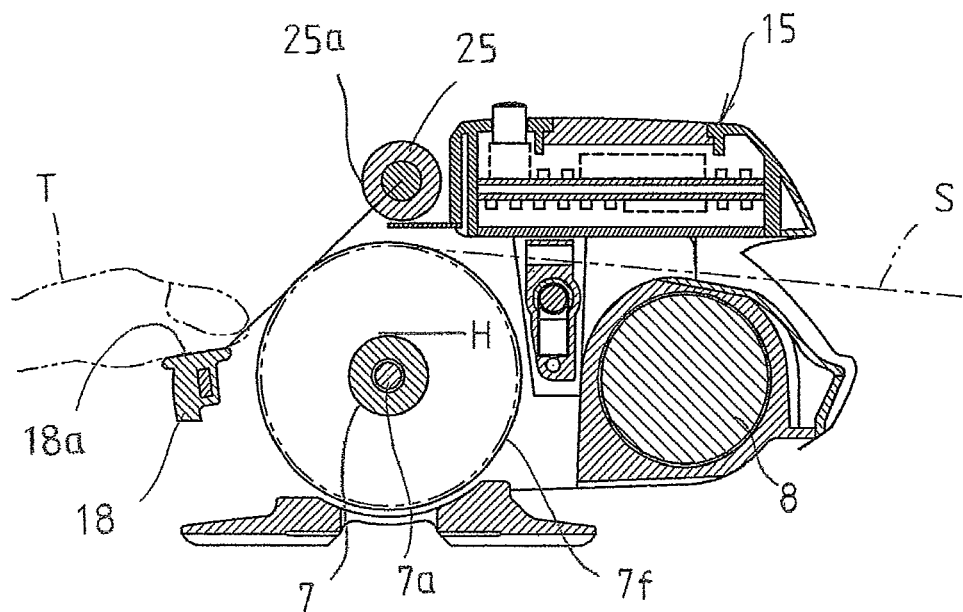
FIG. 14 is a view illustrating a clutch-ON state.
Figure 15:
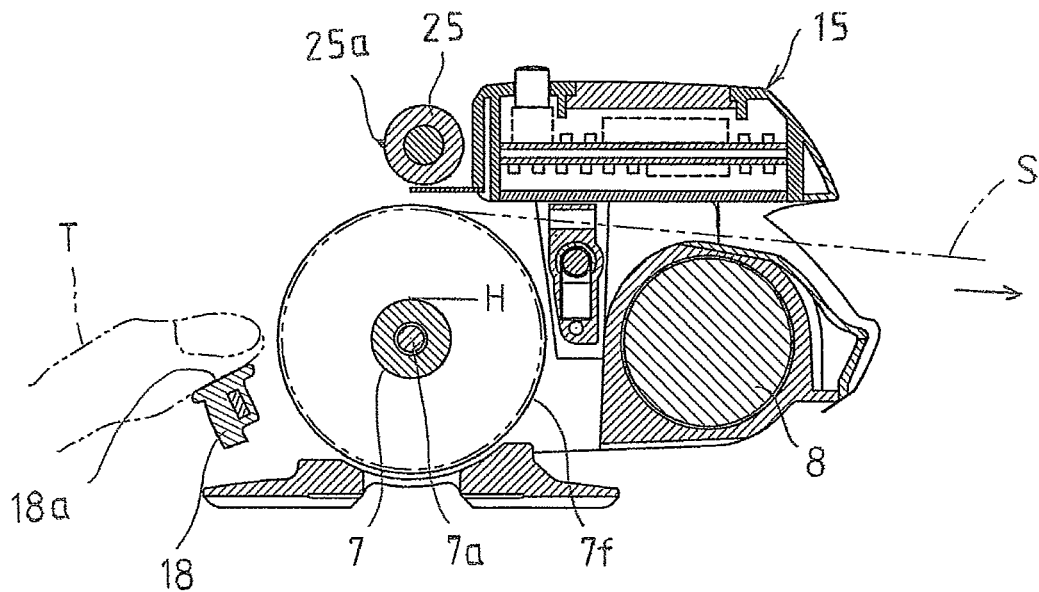
FIG. 15 is a view illustrating a state in which the clutch-ON state has been switched to a clutch-OFF state.
Figure 16:
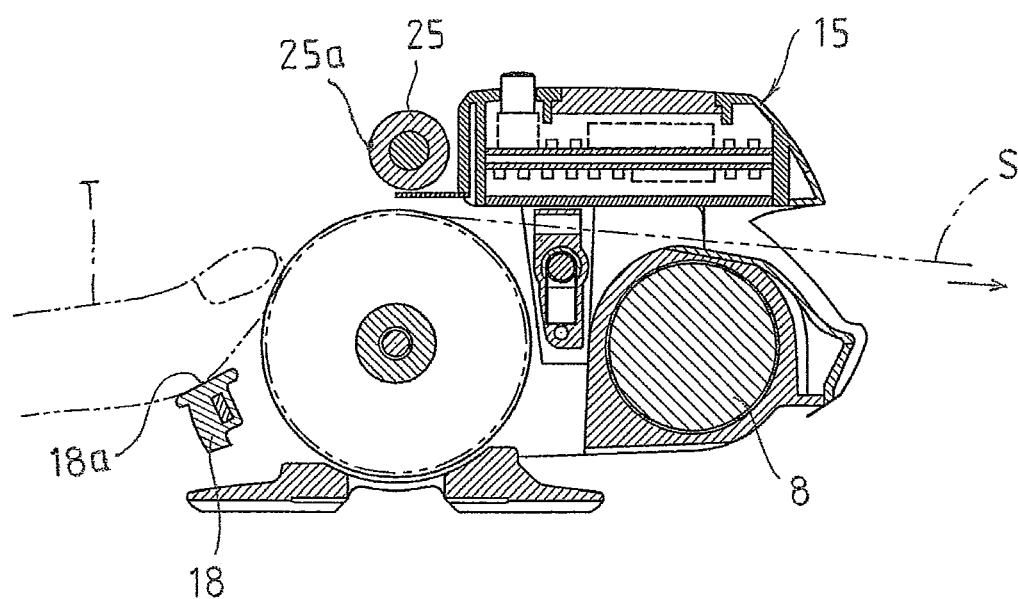
FIG. 16 is a view illustrating a state in which a thumbing operation is performed in the clutch-OFF state.
Figure 17:
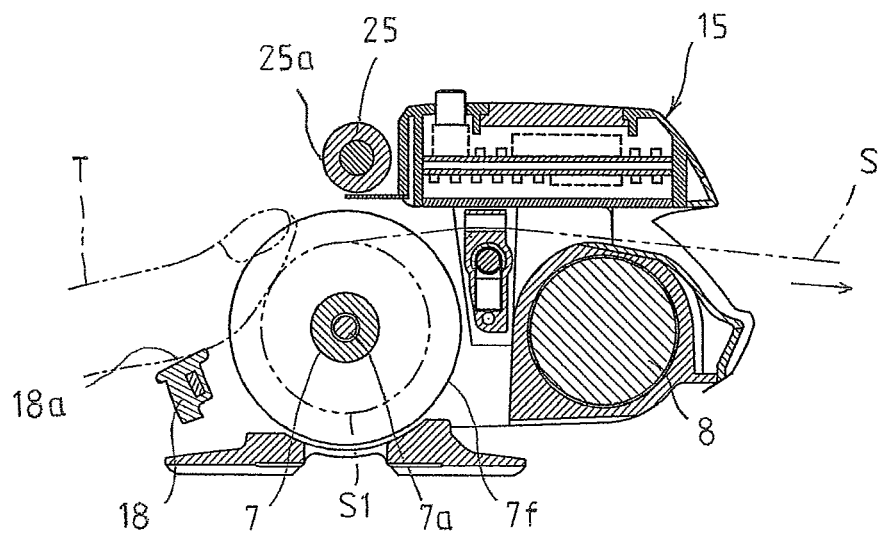
FIG. 17 is a view illustrating a state in which the thumbing operation is performed in the clutch-OFF state, and a state before being switched to the clutch-ON state.

The clutch-OFF switching member 18 of the present embodiment is formed so that the operation portion (upper surface on which thumb can be mounted) 18a is largely curved toward the lower part as is illustrated in FIG. 3, and is formed so that when being visually recognized from behind (see FIG. 3), the center 18c of the operation portion comes to the lowest position. In other words, it becomes possible to shorten a distance between the clutch-OFF switching member 18 and the fishing rod, by forming the clutch-OFF switching member 18 so as to be curved in this way, and the clutch-OFF operation is easily performed in such a state that the main body of the reel is grasped together with the fishing rod. Particularly, in the case in which the reel is structured as a small-sized reel that can be operated in a state of being supported by hand, when each portion is operated while the main body of the reel is grasped, the path of the thumb is secured in a low position, and a range which the finger reaches is enlarged. Accordingly, the reel can be structured so as to make the operator resist being tired. Incidentally, both sides of the operation portion 18a which are largely curved are formed so as to become gradually higher toward the side part, in order that the clutch-OFF switching member 18 stably rotates a clutch plate 17a accommodated in the right side plate. Specifically, the center (this portion becomes a portion to be easily press-operated in operation) 18c which is largely curved toward the lower part out of the operation portion 18a of the clutch-OFF switching member 18 is positioned at the approximately same height position as the upper end position H of the fishing line winding body portion 7b of the spool 7, and is preferably structured so as to be lower than the upper end position H of the fishing line winding body portion 7b (see FIG. 7, FIG. 14 and FIG. 15), when the clutch-OFF operation has been performed.

In addition, the clutch-ON switching member 19 in the present embodiment is installed in the right side plate 5B side, and is distributed and held so as to be swingable between the clutch-ON position and the clutch-OFF position by the distributing and holding spring 400 (see FIG. 6). In this case, as is illustrated in FIG. 6, the operation portion 19a is structured so as to become approximately flush with the surface of the right side plate 5B in the clutch-ON state, and so as to project from the surface of the right side plate 5B in the clutch-OFF state. The operation portion 19a is preferably installed in the side part of the wound fishing line and in a slightly rear side so that the ON operation can be easily performed in a state in which the cushion portion of the thumb performs the thumbing operation with respect to the fishing line that is wound around the spool 7 (so that the thumb can easily reach operation portion 19a while sliding on the rear end side of the left side plate as a supporting point). For information, the clutch-ON switching member 19 may be formed of an electric type member (for instance, member using solenoid) in addition to a mechanical type member. In addition, the clutch-ON switching member 19 may be formed of an integrated member together with the clutch-OFF switching member 18.

The above described main body 5 of the reel is provided with a power feeding portion 20 for feeding an electric power to the drive motor 8. This power feeding portion 20 is formed in the lower surface region in the front side of the left side plate 5A. To the power feeding portion 20, a releasable portable battery 22 (see FIG. 41) is inserted, or a power feeding code 22A (see FIG. 42) is inserted, through which an electric power is supplied to the motor from a battery placed under foot or from a power supply section that is installed in a fishing boat.

The above described control case 15 is provided in the front side of the spool 7. Specifically, as is illustrated in FIG. 7, the control case 15 is arranged on the upper part of the spool 7, and has such a size as to cover a level-wind mechanism 142 and the drive motor 8 from the vicinity of the rotary shaft of the spool 7 (in the present embodiment, this rotary shaft corresponds to the spool shaft 7a because the drive motor 8 is arranged in the outer side of the spool 7, but in another form in which the drive motor 8 is arranged in the inner part of the spool 7, the rotary shaft corresponds to the rotary shaft of the motor 8 because the spool shaft 7a does not exist). In the rear portion, the operation member 25 for adjusting the power of the drive motor 8 is arranged.

The above described operation member 25 is positioned on the upper part of the spool 7, and is supported so as to be capable of being displaced in an approximately front-rear direction (which is fishing rod direction: direction shown by arrow D1 and a direction that matches with the shaft of the fishing rod and includes a range of ±30° with respect to the axial direction which will be described later). Here, the upper part of the spool 7 means that the operation member 25 may exist in the upper part than the spool 7 within a range of the width W (see FIG. 7) in the front-rear direction of the flange 7f of the spool; and in the operation member 25, the operation region (operation portion on which thumb abuts) is preferably positioned in the upper part of a top region of the wound fishing line when a state in which the fishing line is wound around the spool is viewed from the side, in order to enable an abutting operation to be performed while the thumbing operation is performed. In addition, the operation member 25 in the present embodiment is structured to be a rotatable shape which will be described below, in detail, to be an approximately cylindrical shape so that the operation member 25 can be rotation-operated from the lower side and can be adequately operated even in a state in which the main body of the reel is pressed from the upper part; and is rotatably supported with respect to the main body of the reel. Specifically, the outer surface (rotation surface) is supported so as to face an opening region in which the spool 7 is exposed to the outside between the left and right side plates, and is supported so that a direction of being actually operated includes a component which becomes an approximately front-rear direction D1 and a component which becomes an approximately upper-lower direction D2 in a state in which the main body of the reel is grasped and held (see FIG. 1 and FIG. 3).

Figure 41:
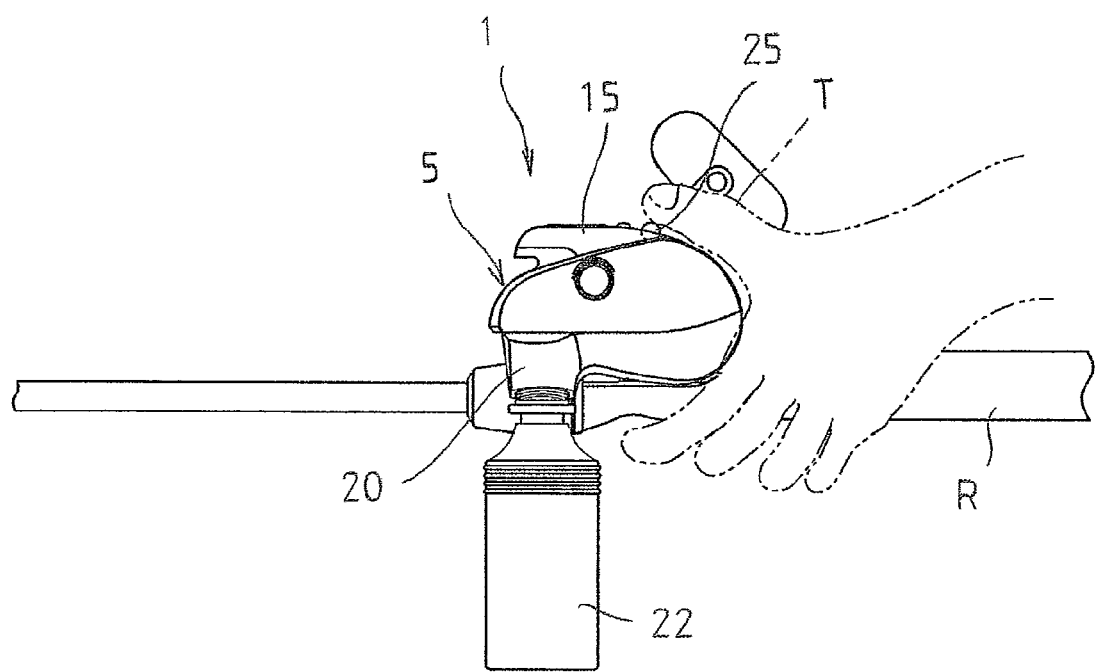
FIG. 41 is a view illustrating an example of how the electrically powered reel for fishing according to the present invention is used when having been structured as a small-sized type.

Such a rotatable operation member 25 is arranged in a position which a thumb T of a hand in a state of grasping and holding both of the main body 5 of the reel and the fishing rod R reaches, when the main body 5 of the reel is mounted on the fishing rod R through a portion 5a to be attached to the fishing rod as is illustrated in FIG. 41, and simultaneously in the position in the rear side of the display section (liquid crystal panel) 16 of the control case 15.

Both ends of the operation member 25 which is formed into the approximately cylindrical shape as described above are rotatably supported (supported by shaft) with respect to the control case 15 (supported by both shafts), which effectively prevents thread entanglement (see FIG. 10). In the present embodiment, particularly, a recessed portion (opening portion) 210 is provided in the center region of the rear side site of the control case 15 (rear end site of the control case 15 positioned in the spool 7 side in a state in which the control case 15 is mounted on the main body 5 of the reel); and the above described operation member 25 is rotatably arranged in the recessed portion 210. (Because of this, the recessed portion 210 results in being positioned in the center region between the left and right side plates 5A and 5B.)

The recessed portion 210 of the present embodiment extends from the rear end edge of the control case 15 toward the front side, and is in an opened state in the rear end edge of the control case 15. Particularly, the recessed portion 210 of the present embodiment has such an "inverted v shape" that the opening width expands toward the spool 7 side (rear side), and penetrates the control case 15 in a vertical direction so as to open on the upper face and the lower face of the control case 15. Such a shape of the recessed portion 210 enables the shift from the thumbing operation to the operation of the operation member 25 to be smoothly performed at any position on the spool 7 without obstacle. Furthermore, the operation member 25 is positioned in the center region between the left and right side plates 5A and 5B. Thereby, a balance of a grasp position with respect to the center of gravity of the main body 5 of the reel becomes adequate, and the reel can be structured so as to have adequate operability and make the operator resist being tired. The operator can obtain common feeling even when having grasped the main body 5 of the reel with any hand of a right hand and a left hand.

The above described operation member 25 is formed into a hollow shape, has a support shaft (rotational center shaft) 26 therein which is formed integrally with the following first support member 220 and is inserted into the operation member 25, and is rotatably supported by the support shaft 26. Specifically, as are illustrated in FIG. 8 to FIG. 11 (particularly, see FIG. 10 and FIG. 11), the support shaft 26 which is inserted into the hollow portion of the operation member 25 is formed integrally with the first support member 220 which is fixed to the control case 15. One side of the operation member 25 is rotatably supported through an O ring 225 (that imparts moderate feeling to rotation of the operation member 25) which is arranged in the tip side of the support shaft 26, in a sealed state. In addition, the other side of the operation member 25 is supported by an inner edge portion 130a of an angle sensor 130, which projects into the hollow portion of the operation member 25, and a collar 229 is interposed between the inner edge portion 130a and the other edge portion of the operation member 25. In other words, in the present embodiment, the angle sensor 130 and the operation member 25 overlap each other in an axial length direction, and thereby, the space is saved in the axial length direction. For information, the support shaft 26 may be supported by a portion other than the control case 15 (for instance, side plates 5A and 5B or the like).

The above described angle sensor 130 is supported and fixed by a second support member 230 with respect to the control case 15. In this case, an accommodation portion 15b for accommodating the angle sensor 130 therein is provided in the right side portion of the control case 15 so as to protrude to the outside. In such a support structure, as is illustrated in FIG. 7 and FIG. 11, an operation portion mechanism which includes the operation member 25, the angle sensor 130 and the support members 220 and 230 for supporting the operation member 25 and the angle sensor 130, and the control section 100 which is accommodated in the control case 15, are arranged in the front-rear direction of the main body 5 of the reel. The control section 100 is completely sealed by a waterproof lid 300 on the back surface of the control case 15, and the above described operation portion mechanism is also waterproofed by not-shown sealing means, independently from the control section 100. (Angle sensor 130 itself is completely sealed.) Of course, both of the operation portion mechanism and the control section 100 may be waterproofed without making each of them independent from the other, by embedding the angle sensor 130 in the control case 15.

Incidentally, the approximately cylindrical shape in the above described operation member may have a solid inner part, and is such a concept as to include a shape in which there is wholly or partially a hollow portion. (In the present embodiment, the hollow portion is formed in the inner part, and has the support shaft 26 which is formed integrally with the first support member 220 inserted therein.) Furthermore, the outer shape may be, of course, an exact cylindrical shape, and also may be such a shape that unevenness is formed in the periphery, or that a protruding portion is formed which can be pinched or be abutted by the finger. Alternatively, as is illustrated in FIG. 10, the operation member may have such an outer shape that the cushion part of the thumb can be abutted in the axial direction and the rotation operation can be performed, such as a shape in which a middle portion in the axial direction is swelled or recessed. Furthermore, the operation member 25 formed into the approximately cylindrical shape may project from the surface of the control case 15, or the rotation surface in at least one end side may be structured to be approximately flush with the control case (main body of reel).

In addition, in the present embodiment, the support shaft (rotational center shaft) 26 of the operation member 25 having the approximately cylindrical shape is installed so as to avoid the display section 16 of the control case 15 or the control section 100 and so as to extend in approximately parallel to the spool shaft 7a of the spool 7, when the main body 5 of the reel is viewed from the upper part.

Figure 42:
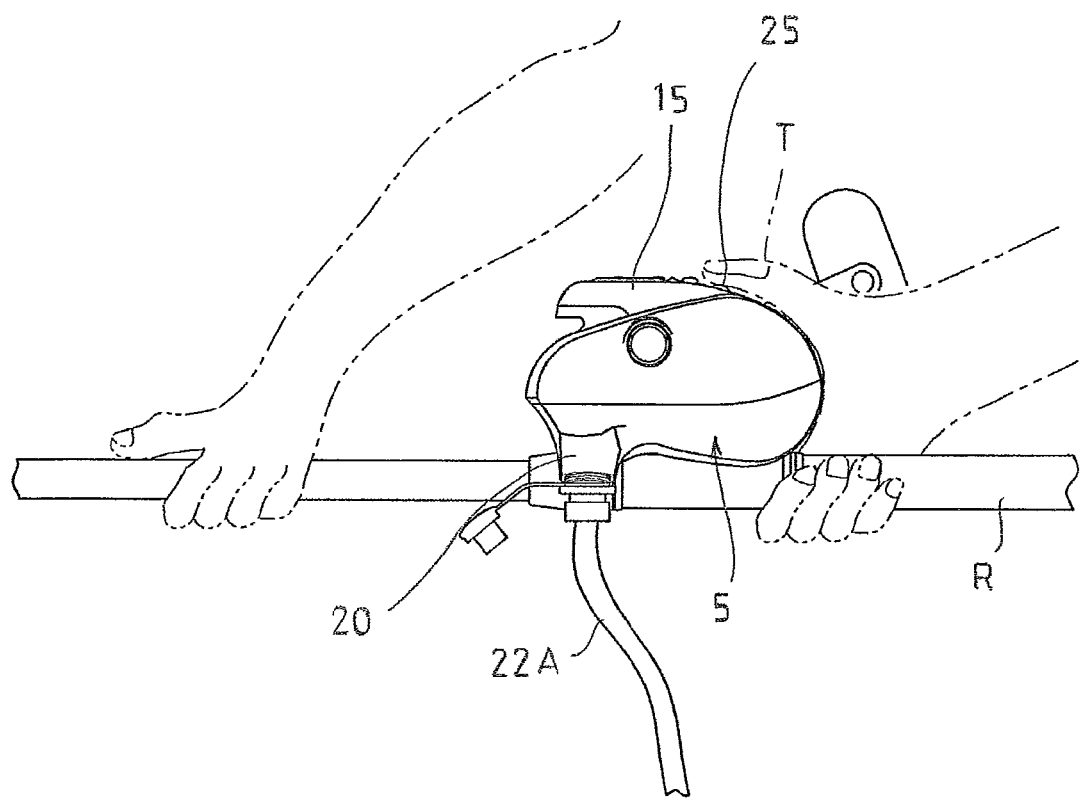
FIG. 42 is a view illustrating an example of how the electrically powered reel for fishing according to the present invention is used when having been structured as a medium-sized to a large-sized type.

Thus, the operation member 25 (support shaft 26) having the approximate cylindrical shape is arranged so as to be approximately parallel (including parallel) to the spool shaft 7a of the spool 7, and thereby the position of the finger (thumb T) becomes hard to deviate in a transverse direction and a balance when the main body of the reel is grasped and held does not become worse, even when the operation member 25 is freely rotated in a state in which the main body of the reel is grasped and held. In other words, the operation member 25 moves only to the front-rear direction, and accordingly the position of the thumb does not largely deviates in a transverse direction when the thumb abuts the operation member 25, and the operation member 25 does not degrade operability and does not make an operator be tired due to a torsion load which is caused by a force that is applied to the center of gravity of the main body of the reel or applied to the power feeding portion 20. (As is illustrated in FIG. 41 and FIG. 42, the power feeding portion is provided in the side portion, and accordingly, a force due to the rotation load applied around the longitudinal shaft of the fishing rod R is easily applied to the reel by a force of being pulled by the power feeding code, a weight load of the portable battery and the like.) In this case, a range of being approximately parallel may be defined as a range of ±30° with respect to the rotary shaft of the spool, in consideration of the deviation of the position of the finger (thumb) toward the transverse direction, which occurs when the operation member 25 has been rotated. Accordingly, "approximately front-rear direction" which is a displacement direction of the operation member 25 includes, of course, the front-rear direction (axial direction of fishing rod), and includes a range of ±30° with respect to the axial direction.

In addition, according to the above described structure, it becomes possible to install the operation member 25 and the clutch-OFF switching member 18 so that the operation movement direction (D1 direction) of the operation member 25 is approximately parallel to a straight line L obtained by connecting the center 25c of the operation portion of the operation member 25 with the center 18c of the operation portion of the clutch-OFF switching member 18, when the main body 5 of the reel is viewed from the upper surface (see FIG. 5). By employing such an arrangement form, it becomes possible to move the finger on the same straight line when a series of the sounding operation is performed, and the operability can be enhanced.

Furthermore, in the above described structure, it is preferable to install the operation member 25 and the clutch-OFF switching member 18 so that the center positions 25c and 18c of the members are in the upper part of the portion 5a to be attached to the fishing rod of the main body 5 of the reel and in the range of the width W1 in the left-right direction when the reel is viewed from the rear part (see FIG. 3).

By employing such an installation form, the grasping and holding position with respect to the main body of the reel does not largely swing to left and right, not only during the sounding operation but also during a series of operations (including the case in which fish may be caught) of ejecting the fishing tackle to winding the fishing tackle, and it becomes possible to keep a stable grasping and holding state even when a load such as a rapid force of being pulled by the fish is applied to the reel in any state.

In addition, the above described control case 15 accommodates the control section 100 therein for controlling the driving of the drive motor 8, as is illustrated in FIG. 7, and is structured so as to adjust the power of the drive motor 8 according to the amount of the rotation operation for the operation member 25. In this case, the control section 100 is set so that the power of the drive motor 8 increases by rotation-operating the operation member 25 toward the front part. (The operation member 25 is installed so that a direction closer to the clutch-OFF switching member 18 is the low-speed driving side of the drive motor.) Thereby, when the fishing line is wound, the operation of winding the fishing line can be performed by performing an operation of extending the thumbing thumb to the front part from the state and pushing up the operation member 25, the movement of the finger is simplified, and the operability of the time when a series of the sounding operation is performed can be enhanced.

Incidentally, a relationship between the amount of the rotation operation for the operation member 25 and the power of the drive motor 8 is arbitrary, but in the present embodiment, the motor power is set so that the reference position of the operation member 25 is a position at which an power value of the motor is 0, and so as to become maximum when the operation member 25 is rotation-operated toward the front part by 120°. In other words, the operation member 25 is structured so as to increase the speed of rotation when being operated toward the front direction, and thereby the operator can grasp the further front part at the time of a high-speed winding operation in which a load is applied to the fishing rod and to the hand that holds the main body of the reel, which accordingly results in improving the graspability and holdability, showing adequate operability and making the operator resist being tired.

Of course, the operation member 25 may be set so as to increase the power of the drive motor 8 when being rotation-operated toward the rear part. Such a structure of the operation member enables the thumbing operation to be switched from ON to OFF, and simultaneously enables the operation member to be rotation-operated to the rear side (increasing the rotation of drive motor), only by an action of folding a first joint of the thumb which is thumbing the spool, and results in being a structure having excellent operability.

The display section (liquid crystal display section) 16 for displaying the length of the unwound fishing line (thread length information) and the like are provided on the surface of the above described control case 15, and a plurality of operation buttons 16a and 16b which can set various information are arranged in the periphery of the display section 16. Incidentally, in the present embodiment, as is illustrated in FIG. 1, the operation buttons 16a and 16b are arranged in positions between the display section 16 and the operation member 25 on the upper surface of the control case 15, which the thumb reaches in a state in which the main body 5 of the reel and the fishing rod R are grasped and held together.

Here, a configuration of the control section 100 which is accommodated in the above described control case 15 will be described below with reference to FIG. 12.

Figure 12:
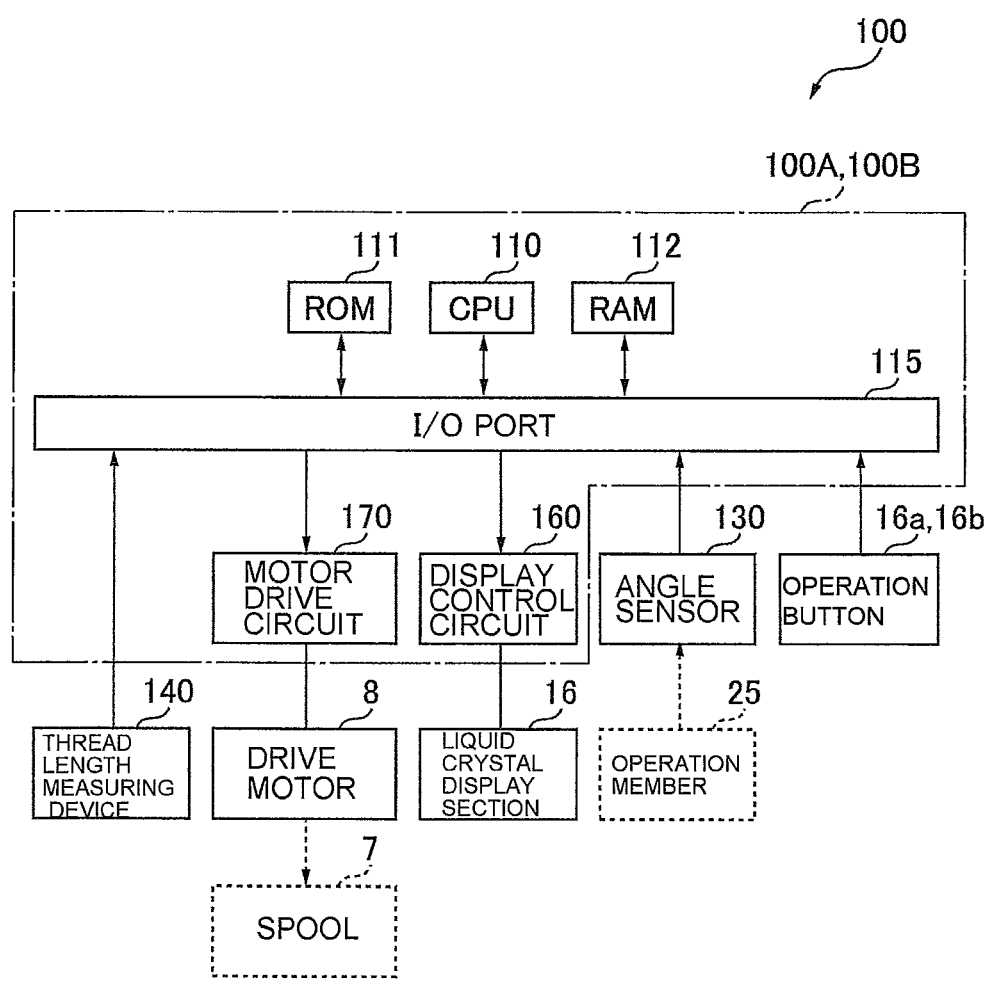
FIG. 12 is a block diagram illustrating a configuration of a control section accommodated in the control case.

FIG. 12 is a block diagram illustrating the configuration of the control section 100 for controlling the operation of the electrically powered reel for fishing having the above described structure.

The control section 100 which is accommodated in the control case 15 includes: a CPU (Central Processing Unit) 110 for controlling the operation of the electrically powered reel for fishing; an ROM (Read Only Memory) 11 which measures the thread length and stores various programs for variably controlling the power of a drive motor, set information and the like; a control substrate (microcomputer) which mounts an RAM (Random Access Memory) 112 thereon as a temporal storage region; and a circuit substrate which mounts various driving circuits thereon. The control substrate transmits/receives a signal to/from various operation elements through an I/O port 115, and controls the operations. Incidentally, in the present structure, the control section 100 and the display section 16 are arranged so as to overlap each other in the upper-lower direction, for space saving (see FIG. 7). In addition, the control section 100 is constituted by the control substrate 100A and the circuit substrate 100B which are arranged in the upper-lower direction.

The above described control substrate 100A is structured so as to transmit/receive a signal between the above described control substrate 100A and detection means for detecting the operation amount of the above described operation member 25, which specifically includes: the above described angle sensor 130 for outputting the operation position signal according to the operation angle of the operation member 25; a thread length measuring device 140 which can detect the amount of unwinding the fishing line wound around the spool 7; a display control circuit 160 for displaying various information on the liquid crystal display section 16 provided on the control case 15; the operation buttons 16*a* and 16*b* provided on the control case 15; and a motor drive circuit 170 for continuously adjusting the increase and decrease of the power of the drive motor 8 from a value at a stop state to a high power value. The above described CPU 110 has a function of executing predetermined programs stored in the ROM 111, supplying control signals generated in response to the programs to the above described respective operation elements through an I/O port 115 to control the respective operation elements, and controlling the whole electrically powered reel for fishing.

In addition, the above described ROM 111 stores various programs which are executed by the CPU 110, and data needed for control processing (for instance, a computing program for measuring the thread length based on a detection signal input from the thread length measuring device 140, a variable control table for specifying a duty ratio for varying an operation angle of the operation member 25 and the rotation speed of the drive motor 8 corresponding to the operation angle, image display data for displaying an image such as a character and a number on the liquid crystal display section 16, and the like). In addition, the above described RAM 112 is provided with a work region, and has a function of temporarily storing a processing procedure, data and the like, when the above described program is operated.

The above described operation buttons 16*a* and 16*b* receive various information from the fisherman, which includes, for instance, the depth information of a desired depth at which a charged fishing tackle should stop, the power range setting information by which a variable range of the power of the drive motor 8 is changed, and the like.

The above described thread length measuring device 140 detects, when the spool 7 is rotated and driven by the unwinding/winding of the fishing line, an actual rotation quantity and a rotation direction, for instance, with a magnet mounted in the rotation portion and a magnetic sensor for detecting the magnet, and generates the detection signal.

The above described motor drive circuit 170 has a function of driving and controlling the drive motor 8 for rotating and driving the spool 7. Specifically, the motor drive circuit 170 variably controls, for instance, a passing time ratio (duty ratio) of a driving current for the drive motor on the basis of a control signal (PWM signal; pulse width modulation signal) sent from the above described CPU 110, and continuously adjusts the increase and the decrease of the power of the drive motor 8 from a stop state (OFF state) to a high-speed rotation state (maximum state). Incidentally, the above described CPU 110 outputs a control signal concerning the duty ratio which has been set for each angle, on the basis of a detection signal sent from the angle sensor for detecting the actual operation amount from the initial position (OFF position) of the operation member 25.

The above described display control circuit 160 is driven on the basis of the control of the above described CPU 110, and has a function of displaying various information for the fisherman, which includes, for instance: the unwound amount of a present fishing line, the time having passed after a fishing tackle has been charged, the driving speed (which may be displayed on indicator) of the drive motor 8, or an operation method and a message, on the liquid crystal display section 16.

The angle sensor 130 for detecting the operation rotation angle of the operation member 25 may have a function of generating a signal in response to the operation angle of the operation member 25, and can employ devices having various structures such as a device provided with a potentiometer for outputting the change of a resistance value according to the operation amount of the operation member and a device provided with an encoder for generating a pulse according to the operation amount, for instance.

In the above described structure, each component member of the reel (main body 5 of reel) is arranged so as to avoid the virtual straight line, when the operation portion 25*a* of the above described operation member 25 and the operation portion 18*a* of the clutch-OFF switching member 18 are connected to each other with the virtual straight line of which the distance is shortest. In this case, the operation member 25 is rotatably supported with respect to the main body of the reel (control case), the operation portion 18*a* of the clutch-OFF switching member 18 is movably supported in the upper-lower direction with respect to the main body of the reel, and the operation region of the respective operation portions is structured so as to have a certain degree of width and length. In addition, in the above described sounding operation, the clutch is turned OFF in a state in which the driving of the drive motor 8 is stopped, and accordingly the above described virtual straight line is considered on the basis of a relationship between the position of the operation portion 25*a* of the operation member 25 when the drive motor has been stopped (here, position that becomes the most rear end at which operation can be performed when the motor power is 0), and a position of the operation portion 18*a* of the clutch-OFF switching member 18 at that time (position of the operation portion 18*a* when the clutch is turned ON). Specifically, the virtual straight line includes all lines which have connected both of the operation portions with the shortest distance (which means straight line having no curve) within a range of positions on which the finger abuts and at which operation can be performed, in the respective operation portions, and the component member of the reel, which disturbs the movement of the finger, may not exist therebetween. If both of the members are structured so as to satisfy such an arrangement relationship, any obstacle does not exist when the finger is moved from the operation portion of the operation member 25 to the clutch-OFF switching member 18 in the state in which a sounding operation is performed, which accordingly enables the operation of moving the finger to be smoothly and quickly performed.

The virtual straight line according to the present embodiment will be specifically described below. The virtual straight line is defined as a line which has connected an arbitrary point (arbitrary point within operatable region) which specifies the shape of the operation portion, with an arbitrary point which specifies the operatable region when the above described operation member 25 is moved to a stop position (at which motor power is 0), by a straight line in which a distance between the points becomes shortest, in the operation portion 18a of the above described clutch-OFF switching member 18, which has width (height) in a front-rear direction, an upper-lower direction and a left-right direction. Of course, such a virtual straight line exists infinitely between both of the members, but may be actually defined as lines connecting portions which are most frequently operated, and the component member of the reel may not exist therebetween. In other words, because the operation portion 18a of the clutch-OFF switching member 18 is press-operated by the finger which has been mounted on the most recessed center portion 18c, in the structure of the present embodiment, the reel may be structured so that each component member of the main body 5 of the reel does not exist at least on straight lines which connect the end positions P1 and P2 (see FIG. 7) in the front-rear direction of the center portion 18c, and end positions P3 and P4 (see FIG. 3) of the operation portion in a state in which the motor power value in the operation member 25 is 0, which are specifically the end positions at which operation in the left-right direction can be performed at the most rear end because the operation member has an approximately cylindrical shape. As long as the component member of the reel does not exist on a straight line which connects such points (P1 and P3) and (P1 and P4), and a straight line which connects such points (P2 and P3) and (P2 and P4), the movement of the finger shall not be disturbed when a usual operation is performed.

Thus, when the positions at which both of the operation member 25 and the clutch-OFF switching member 18 can be operated are connected to each other with the straight line which makes a distance between the positions shortest, a member which disturbs the movement of the finger does not exist between the respective operation portions, and accordingly the finger can be moved in the shortest distance, which accordingly enables the operation of moving the finger during the sounding operation to be smoothly and quickly performed. The finger is not moved largely as well, which does not also degrade the graspability and holdability of the main body 5 of the reel.

In addition, in the present embodiment, both of the operation member 25 and the clutch-OFF switching member 18 are installed between the left and right side plates 5A and 5B, and accordingly, the virtual straight lines which are defined as having been described above are structured so as to fit between the left and right side plates 5A and 5B.

Thereby, a thumb portion of grasping and holding the main body 5 of the reel results in existing in the center region of the reel in the left-right direction, during the sounding operation, the rotation moment becomes small, and the graspability and holdability can be enhanced. For information, if the component member of the main body of the reel does not exist on the virtual straight line which is defined as having been described above, any one of the operation member 25 and the clutch-OFF switching member 18 may be installed on the left and right side plates or on the outer side thereof.

Furthermore, in the above described structure, the spool 7 is preferably installed so that the above described virtual straight line passes through a region in a range of ±10% of the outer diameter of the flange 7f of the spool 7, when the spool 7 is visually recognized from the axial direction (see FIG. 7). Thereby, the fishing line wound around the spool 7 is not wound so as to exceed the flange 7f, and the maximum wound amount stays at the approximately same position as the amount up to the flange 7f. When the sounding operation is actually performed, the fishing line is in an ejected state, and accordingly even if the virtual straight line has passed through the position which is −10% of the outer diameter, the movement of the finger is not hindered, and the wound amount fits in an allowable range. (For information, if the virtual straight line has exceeded +10%, the main body of the reel tends to be large-sized, which is not preferable). In FIG. 7, a virtual straight line L1 which becomes closest to the spool is shown, out of the virtual straight lines, and the virtual straight line which connects the operation portions to each other actually results in existing in the upper part side than the straight line L1 (outer side from spool in diameter direction). Here, a virtual straight line L2 which is the most upper part side (straight line L2 which connects P2 with outer peripheral surface of operation member 25) may fit in a range of +10% of the outer diameter of the flange 7f of the spool 7.

When the reel is structured in this way, it becomes possible to set a distance between the operation portion (outer peripheral surface) of the operation member 25 and the operation portion 18a of the clutch-OFF switching member 18 so as to be short, and simultaneously secure the position of the finger in a thumbing state at a more preferable position, specifically, a position at which thumbing properties are adequate, a position at which a fingertip can touch the operation portion of the operation member while performing the thumbing operation, and a position at which the clutch-OFF operation can be performed while the thumb is performing the thumbing operation. In addition, when the finger moves from the operation portion (outer peripheral surface) of the operation member 25 to the clutch-OFF switching member, the movement is not disturbed by the fishing line wound around the spool 7, and it becomes possible to set the outer peripheral position of the surface of the wound fishing line so as to be an ideal position. In other words, for instance, when the sounding operation is performed, the fishing line is in a state of having been ejected to some extent, and accordingly when the finger is moved, the movement is not disturbed by the fishing line. Furthermore, the above described arrangement relationship can be easily achieved, by largely curving the surface of the clutch-OFF switching member 18 so that the center of the member becomes the lowest position.

In addition, as is illustrated in FIG. 7 and FIG. 11, the above described control case 15 has preferably a protection cover 15c provided in the lower end portion in the rear part side of the control case 15, as a malfunction prevention portion which projects toward the rear part side between the operation member 25 and the spool 7. When such a protection cover 15c is formed, the protection cover 15c prevents a dust or a foreign matter which deposits on the fishing line from abutting on the operation member 25 when the fishing line is wound, and can prevent the malfunction from occurring. For information, the malfunction prevention portion 15c may be a component which is formed integrally with the control case 15, or may also be such a component that a metal thin plate material is bonded to the control case 15.

Next, an operation when an operator actually fishes on a boat using an electrically powered reel for fishing having the above described structure will be described below with reference to FIG. 13 to FIG. 22. For information, a series of fishing operations which will be illustrated below can be performed in a state in which the main body of the reel is grasped by hand together with the fishing rod.

Firstly, a clutch mechanism is switched from an ON state to an OFF state by press-operating the operation portion 18a of the clutch-OFF switching member 18 arranged in the rear part side of the spool with the thumb of a hand which grasps the main body 5 of the reel together with the fishing rod (see FIG. 13(A) and FIG. 13(B), FIG. 14, and FIG. 15). When the clutch mechanism is switched from the ON state to the OFF state, the spool 7 becomes a free rotation state, and a fishing tackle falls. At this time, the clutch-ON switching member 19 swings, and the operation portion 19*a* projects from the surface of the right side plate 5B and becomes a state in which a pressing operation can be performed. In addition, a backlash easily occurs until the fishing tackle falls and reaches the bottom (reaches predetermined shelf), but the backlash can be easily prevented by extending a thumb T which grasps the main body 5 of the reel, from the operation portion 18*a* of the clutch-OFF switching member 18 to the surface of the fishing line in the state, and thumbing the fishing line with the thumb T (see FIG. 16).

When the fishing tackle falls onto the bottom or falls onto the predetermined shelf (while wound thread amount is normally set to be approximately half), the state can be easily switched to the clutch-ON state by deviating the thumb in the thumbing state to the side part (see FIG. 17), and pressing the operation portion of the clutch-ON switching member 19 in the projecting state (see FIG. 13(C)).

As is illustrated in FIG. 13(C), when the fishing tackle falls onto the predetermined shelf (lower layer region in which fish exists), the wound surface S1 of the fishing line S which is wound around the spool 7 surely becomes lower (inner diameter side) than the virtual straight line which is defined as having been described above, as is illustrated in FIG. 18, and the fishing line S settles down in a positional relationship convenient for waiting a next action (nibble sensitivity, sounding operation, winding operation, flapping operation or the like) while the thumb T is thumbing the fishing line. Incidentally, even when the reel is in the clutch-ON state, the spool has play in the rotation direction, because a plurality of gears are engaged with each other between the spool and a reverse rotation prevention mechanism, and the nibble of the fish in the state illustrated in FIG. 18 can be sensed by using the play.

In addition, the sounding operation is actually performed, for instance, as is illustrated in FIG. 13(D) to FIG. 13(F) so as to intensively sound a shelf in which fish exists. (Here, such a sounding operation will be described below while taking scattered bait fishing as an example.)

Figure 18:
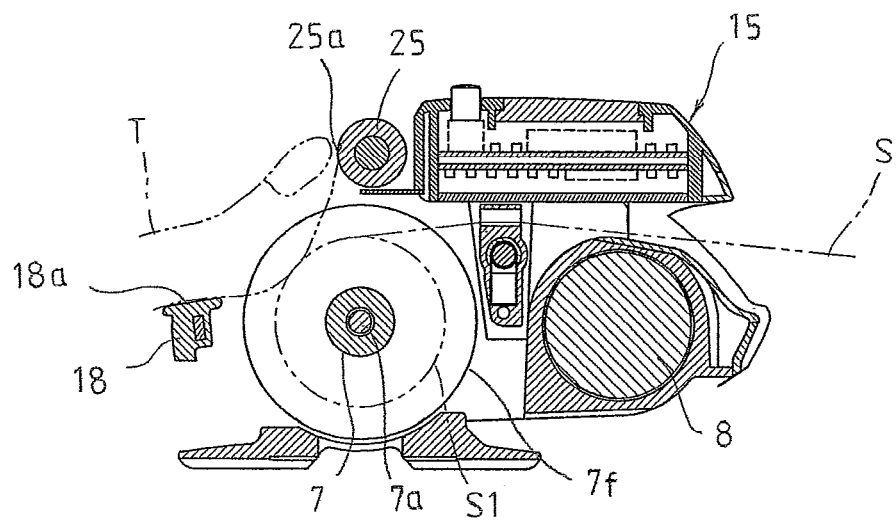
FIG. 18 is a view illustrating a state (standby) in which the operation member is touched by a finger while the thumbing operation is performed in the clutch-ON state, and driving for winding a spool can be started.

Firstly, as is illustrated in FIG. 13(C), the fishing tackle is ejected and reaches the desired shelf, and then the bait is scattered, as is illustrated in FIG. 13(D). At the time when the bait is scattered, the operation can be performed in such a state that the main body 5 of the reel is firmly grasped, as is illustrated in FIG. 41 and FIG. 42. In addition, if the operator waits for the nibble of the fish, the operator can keep the thumb T abutting on the operation member 25 while performing the thumbing operation as is illustrated in FIG. 18, and accordingly the nibble is easily sensed; and also when the nibble is sensed, the thumbing operation can be immediately shifted to the winding operation.

Figure 19:
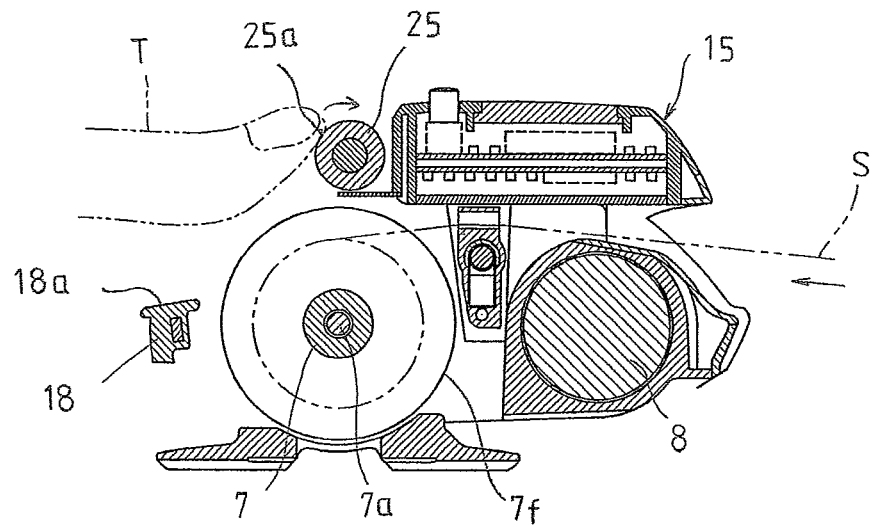
FIG. 19 is a view illustrating a state in which the operation member is operated without the thumbing operation in the clutch-ON state, and the driving for winding the spool is performed.
Figure 20:
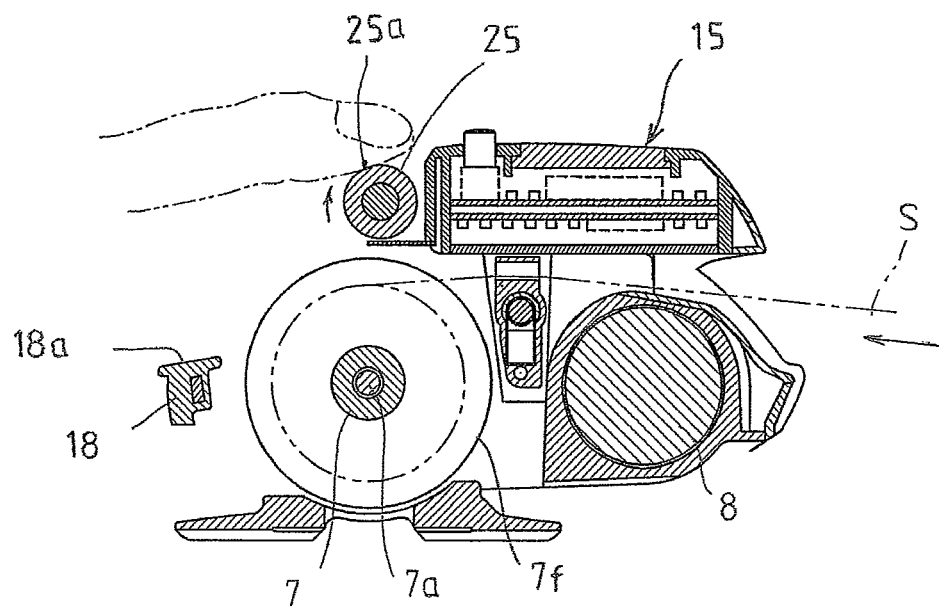
FIG. 20 is a view illustrating a state in which the operation member is operated without the thumbing operation in the clutch-ON state, and the driving for winding the spool is performed.

After having shaken the scattered bait basket and ejected the scattered bait, the operator winds up the bait to the region to which the scattered bait has been ejected, by an operation of winding and driving the bait to the upper layer region of the shelf at a low speed (see FIG. 13(E)). At this time, the winding and driving operation of the fishing tackle can be performed by the operation of abutting the tip of the thumb T on the surface (operation portion 25*a*) of the operation member 25 in such a state that the thumb T keeps a thumbing operation as is illustrated in FIG. 18, and rotating the operation member 25 in the state. Alternatively, as is illustrated in FIG. 19 and FIG. 20, the winding and driving operation can be performed also by moving the thumb so as to rotate the operation member 25 without performing the thumbing operation. Alternatively, the winding and driving operation can be performed by rotating the operation member 25 by pressing the thumb to the front part subsequently in a state in which the main body of the reel is held by the whole palm (see FIG. 19), or rotating the operation member 25 by pressing the thumb from the upper part (see FIG. 20).

After having wound the fishing tackle to the upper layer region of the shelf, the operator drops the fishing tackle to the predetermined shelf again (lower layer region in which fish exists) (see FIG. 13(F)). As is illustrated in the state illustrated in FIG. 20 to FIG. 22, this operation can be performed by shifting the thumb T to the rear part in the state while the tip side of the thumb T abuts on the operation member 25, turning the driving of the drive motor 8 OFF (see FIG. 20 and FIG. 21), and press-operating the operation portion 18*a* of the clutch-OFF switching member 18 with the root side of the thumb T in the state (see FIG. 22). At this time, any member which is likely to disturb the operation does not exist on the virtual line which is defined as having been described above, and accordingly the operations from the state illustrated in FIG. 13(E) to the state illustrated in FIG. 13(F) can be smoothly and quickly performed. Incidentally, when the clutch mechanism is switched from the ON state to the OFF state, the spool 7 becomes a free rotation state, and the fishing tackle rapidly falls; but as is illustrated in FIG. 22, the cushion part of the thumb T can thumb the fishing line in the state, and the falling speed can be easily adjusted, or the fishing tackle can be easily dropped by only a predetermined amount.

In a series of operations (sounding operation) illustrated in FIG. 13(D) to FIG. 13(F), each operation of turning a clutch mechanism ON, winding a fishing tackle (winding driving of drive motor), stopping a drive motor and turning a clutch mechanism OFF is repeated. But because a member which becomes an obstacle does not exist on the virtual line as has been described above, the clutch can be turned OFF by deviating the thumbing thumb to the rear part in the state, or the winding operation is performed by deviating the thumb to the front part in the state, and accordingly the series of the above described sounding operations can be smoothly and quickly performed by the thumb of one hand.

Figure 21:
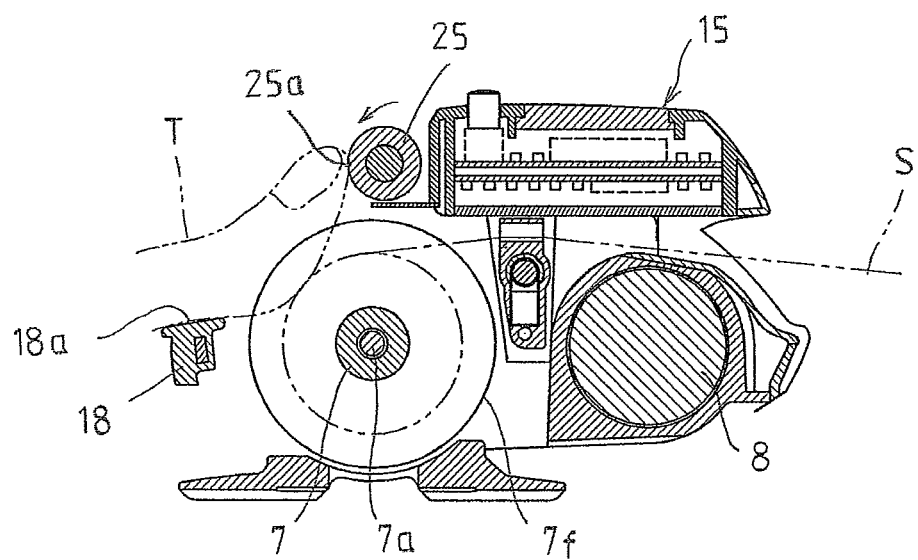
FIG. 21 is a view illustrating a state in which the operation member is operated while the thumbing operation is performed in the clutch-ON state, and the driving for winding the spool is stopped.
Figure 22:
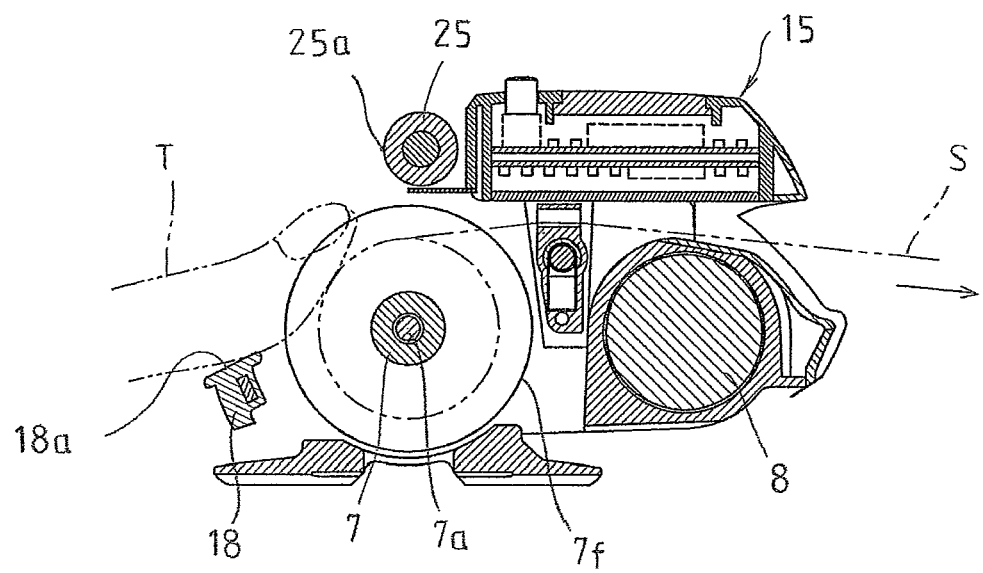
FIG. 22 is a view illustrating a state in which the clutch-ON state has been switched to the clutch-OFF state.

In addition, when the nibble is actually sensed in the state (nibble sensitive state) illustrated in FIG. 18 and FIG. 21, the thumb can set the drive motor at a winding and driving state by instantly moving to the state (state of grasping and holding main body of reel) illustrated in FIG. 19 and FIG. 20, and can even instantly hook the fish.

Figure 13:
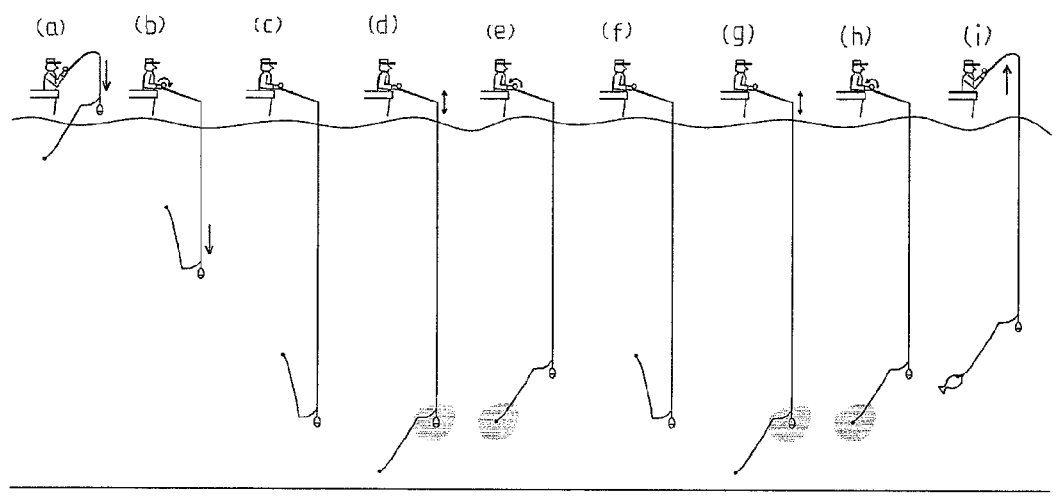
FIG. 13 is a view for sequentially describing a general operation after a fishing tackle has been ejected, which includes FIG. 13(A) to FIG. 13(I)

Furthermore, a heaving operation while winding the fishing line with the drive motor is occasionally performed (though operation of slowly pulling up fishing rod also may be performed), or also the fishing tackle is occasionally raised by performing a temptation operation (see FIG. 13 (H)), from the state in which the fishing tackle is in a predetermined shelf position illustrated in FIG. 13(G), but the winding and driving of the drive motor while such a heaving operation (temptation operation) is performed can be operated in such forms as are illustrated in FIG. 18 and FIG. 20. Particularly, in this winding and driving state, the thumbing operation as illustrated in FIG. 18 can be easily performed; and accordingly the nibble is easily sensed, and when the nibble is sensed, the operation can be immediately shifted to the winding operation. Furthermore, even when the nibble is sensed when the rod is highly heaved as is illustrated in FIG. 18 and FIG. 20, the operator can immediately hook the fish by moving the thumb T which abuts on the operation member 25 and performing the winding operation in the state (see FIG. 13(I)). After having hooked the fish, the operator can grasp and hold the main body of the reel by shifting the thumb T to the side part in the state and pressing down the control case 15, and can operate the fishing rod in a stable state.

As described above, when the above described sounding operation is performed, the structure of the present embodiment enables the thumb abutting on the operation member to linearly move to the clutch-OFF switching member 18 when the finger is moved from the operation member 25 to the clutch-OFF switching member 18, and accordingly an operation of dropping the fishing tackle from a state in which the fishing line is wound can be smoothly and quickly performed. In addition, because the structure enables the thumb to perform such a simple movement operation, the structure also does not degrade the graspability and holdability of the main body of the reel.

Furthermore, in the present embodiment, a recessed portion 210 extending toward the front side is provided in the center of the rear end side site of the control case 15, and the operation member 25 having the approximately cylindrical shape is rotatably supported in this recessed portion 210. Accordingly, a series of operations from the thumbing operation to the operation of winding the spool can be smoothly performed while the fishing rod and the main body 5 of the reel are grasped in one hand in a state of being supported by hand. In other words, the operation member 25 can be arranged in a position that the thumb T of a hand reaches which grasps the main body 5 of the reel together with a fishing rod on which the reel is mounted with one hand, and accordingly a series of operations reaching the operation of winding the spool 7 from the thumbing operation can be smoothly performed without sensing unnatural feeling. Particularly, in the present embodiment, the operation member 25 is arranged in a position which is in the upper part of the spool 7 and in a rear part side of the control case 15, and accordingly the operator can also operate the operation member 25 while grasping the main body 5 of the reel at a position close to the center of gravity. In addition, such a situation can also be avoided that the rotation moment associated with the operation becomes large and the operator becomes tired with the operation. In other words, the present embodiment can achieve the arrangement of the operation member 25 excellent in barycentric balance, operability and graspability.

In addition, in the present embodiment, the recessed portion 210 vertically penetrates the control case 15, accordingly the control case 15 can be formed so as to have a thin thickness regardless of the size of the operation member 25, the main body of the reel is compactly formed, and adequate graspability and holdability can be secured. In addition, when the control case 15 can be thinly formed in this way, the installation position of the operation member 25 can be lowered, and simultaneously the operation member 25 can be also downsized. As a result, the main body of the reel can be downsized, and the graspability of the reel and the operability of the operation member can be enhanced. Furthermore, in the present embodiment, the length dimension in the front-rear direction is set to be longer than a length dimension in the left-right direction, accordingly an arrangement space of other components of the control case 15 can be efficiently secured in a relationship with respect to the operation member 25 which is arranged in the recessed portion 210, and the case structure which sufficiently secures the support strength of the operation member 25 can be achieved.

Figure 23:
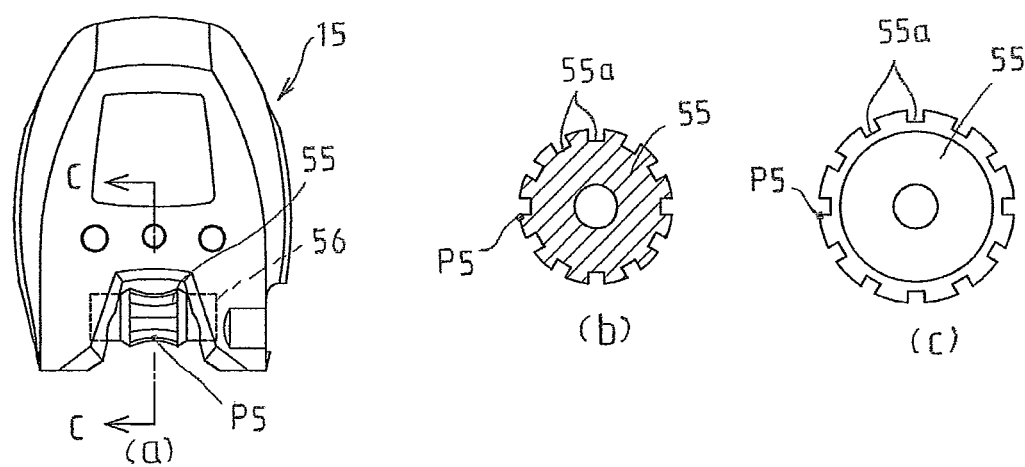
FIG. 23 is a view illustrating a first modified example of the operation member.
Figure 24:
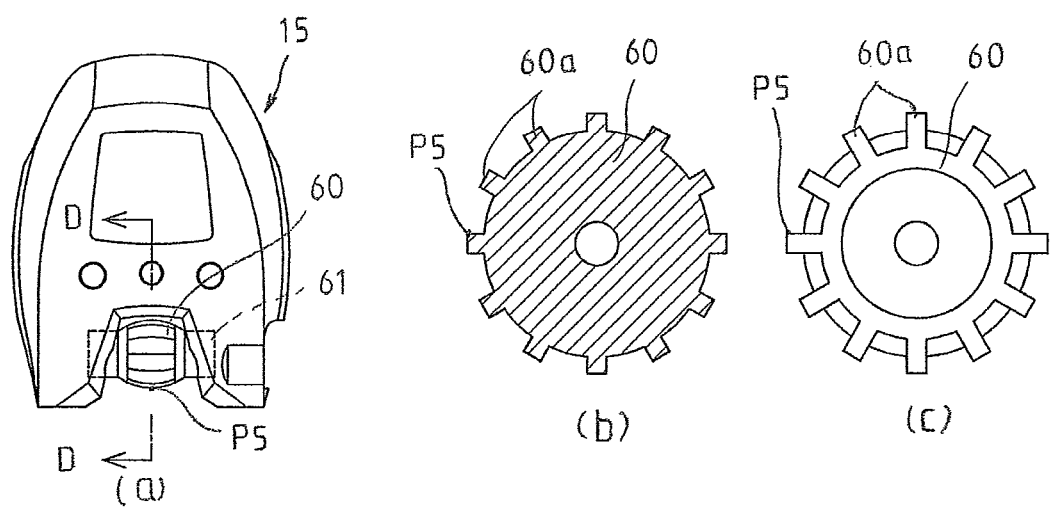
FIG. 24 is a view illustrating a second modified example of the operation member.
Figure 25:
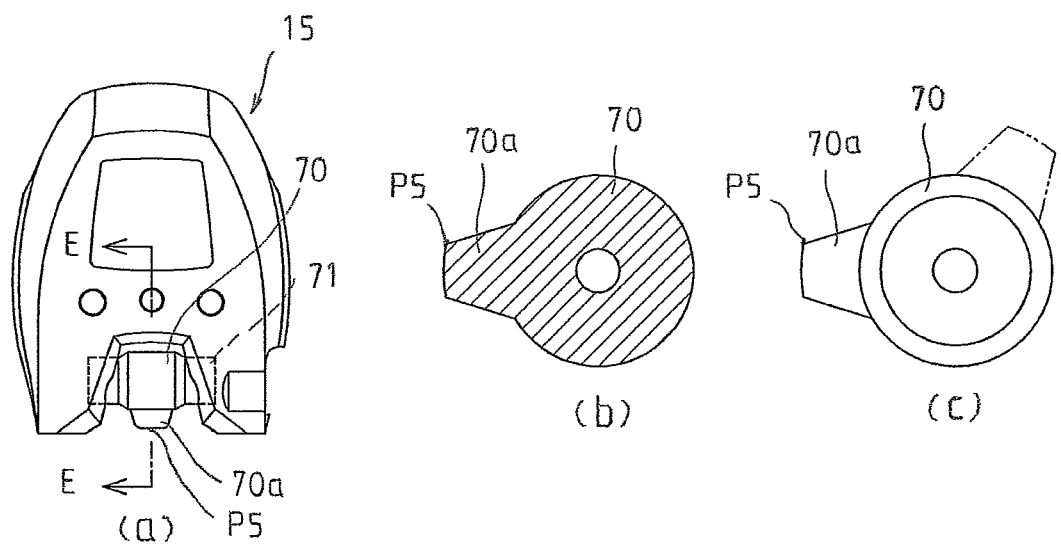
FIG. 25 is a view illustrating a third modified example of the operation member.

FIG. 23 to FIG. 25 illustrate modified examples of the operation member each having an approximately cylindrical shape; in each drawing, (A) is a plan view illustrating the control case portion; (B) is a sectional view of the operation member; and (C) is a side view of the operation member. Incidentally, in each figure (C), P5 denotes an end position (operation portion) in a state in which the motor power values in the respective operation members are 0.

As long as the operation member is formed into the approximately cylindrical shape as in the above described embodiment, the approximately cylindrical shape can be variously modified. Specifically, the shape may be such a shape that the operation member can be rotation-operated, the operation surface portion is flush with an opening which exposes a spool to the outside therethrough between the left and right side plates and the control case, and the thumbing thumb can abut on the operation surface portion by extending the thumb thereto in the state. For instance, the operation member 55 illustrated in FIG. 23 has a rotary shaft 56 supported by both shafts, is formed into such a hand drum shape that the middle portion is contracted by a curved surface, and has grooves 55*a* continuously formed in a circumferential direction in its periphery. In such a structure, the cushion part of the thumb is easy to fit the surface and slippage becomes hard to occur. In addition, the operation member 60 illustrated in FIG. 24 has a rotary shaft 61 supported by both shafts, is formed into such a barrel shape that the middle portion is swelled by a curved surface, and has protrusions 60*a* continuously formed in a circumferential direction in its periphery. In such a structure, the cushion part of the thumb is easy to be caught, slippage is hard to occur, and operability can be enhanced. In addition, the operation member 70 illustrated in FIG. 25 has a rotary shaft 71 supported by both shafts, and has a lever portion (operation portion) 70*a* formed on a part of the surface having a cylindrical shape. In such a structure, a position which shows an initial value (at which power of drive motor is 0) can be clarified, and the operation member can be operated even on a swinging boat when the rod is placed on the boat, by clipping the lever portion 70*a*, which accordingly can enhance the operability.

In each of the above described modified examples, the component member of the reel does not exist between the operation portion (portion shown by P4) of the operation member and the operation portion of the clutch-OFF switching member 18, similarly to that in the above described embodiment. Accordingly, the thumb which abuts on the operation member at the time when the motor power is set at 0 can linearly move to the operation portion of the clutch-OFF switching member 18, and accordingly an operation of dropping the fishing tackle from a state in which the fishing line is wound can be smoothly and quickly performed. In addition, the structure enables the thumb to perform such a simple movement operation, and accordingly also does not degrade the graspability and holdability of the main body of the reel. Incidentally, a portion to be the most easily operated is shown by a point of P5 in any drawing, but the operation portion in the operation member exists in an exposed surface side of the operation member, and accordingly the component member of the reel does not exist between the operation portion of the operation member and the operation portion of the clutch-OFF switching member 18, even when the wide operation portion is adopted in this way.

Figure 26:
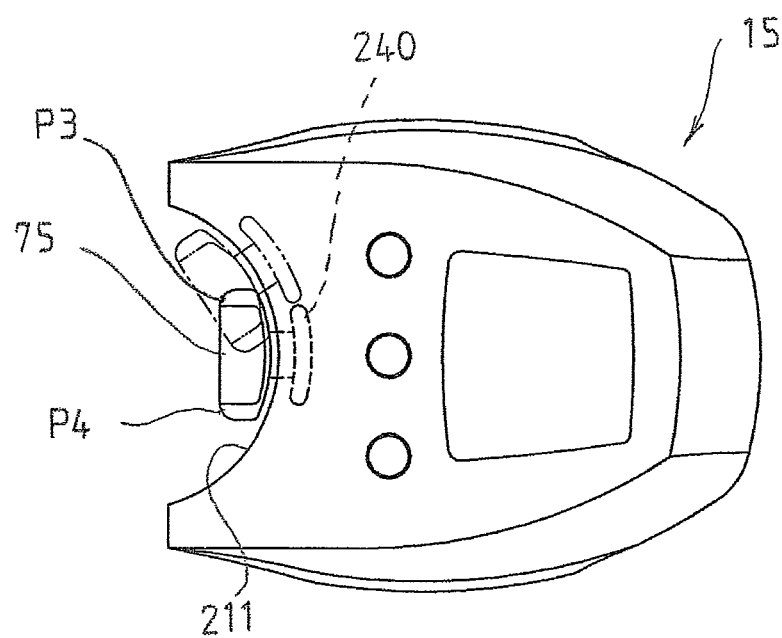
FIG. 26 is a plan view of a control case of an electrically powered reel for fishing according to a second embodiment of the present invention.
Figure 27:
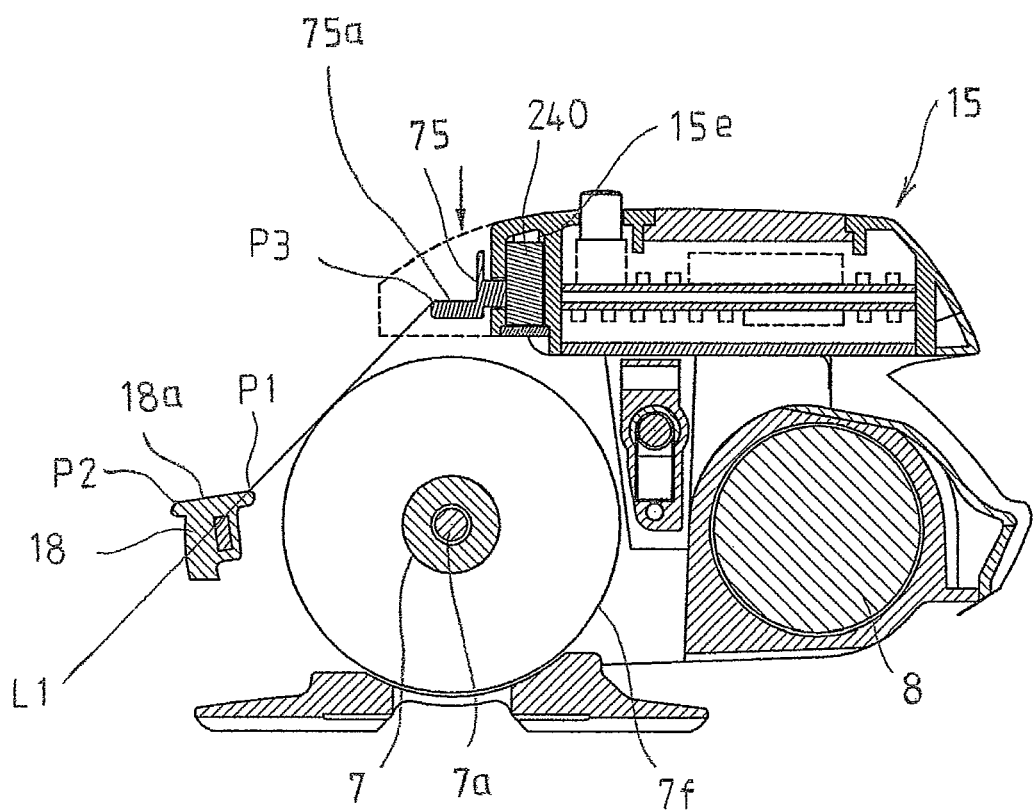
FIG. 27 is a longitudinal sectional view of the electrically powered reel for fishing according to the second embodiment.

FIG. 26 and FIG. 27 are views illustrating a second embodiment of the present invention; FIG. 26 is a plan view of the control case of the electrically powered reel for fishing; and FIG. 27 is a longitudinal sectional view of the electrically powered reel for fishing.

The control case 15 in this embodiment has the rear end site cut out so as to have an arc shape, and a plate-shaped operation member 75 is slidably supported along the arc-shaped inner surface 211. A hollow portion 15*e* extending so as to be an arc shape is formed in the rear end region of the control case 15, and a support member 240 which holds the plate-shaped operation member 75 is installed in the inner part of the hollow portion 15*e*. In this case, a flat plate portion 75*a* which has a rectangular shape and projects toward the rear part becomes an operation portion of the plate-shaped operation member 75; the motor power is set at 0 in a center position shown by a solid line of FIG. 26; and the motor power is set so as to increase as the operation member 75 slidably moves to the left side plate side.

Similarly to the above described embodiment, the reel is structured so that each component member of the main body 5 of the reel does not exist between the operation portion of the operation member 75 and the operation portion of the clutch-OFF switching member 18, specifically, on straight lines which connect the end positions P3 and P4 of the operation member 75 in a state in which the motor power value becomes 0, with the end positions P1 and P2 in the front-rear direction of the center portion of the clutch-OFF switching member 18. (In the figure, virtual straight line L1 is shown which has connected end position P3 of operation portion (flat plate portion 75a) with end position P1 of clutch-OFF switching member.)

Such a structure as well can show the similar functional effect to that in the above described embodiment; and the operation member 75 can be grasped from the upper part as is shown by an arrow of FIG. 27 because the operation portion is structured to be a flat plate shape, and stable graspability and holdability can be achieved. In addition, the control case is cut out so as to have an arc shape, the operation member with a flat plate shape projects along its arc face, and accordingly the structure can also provide an effect as a thumb rest.

Figure 28:
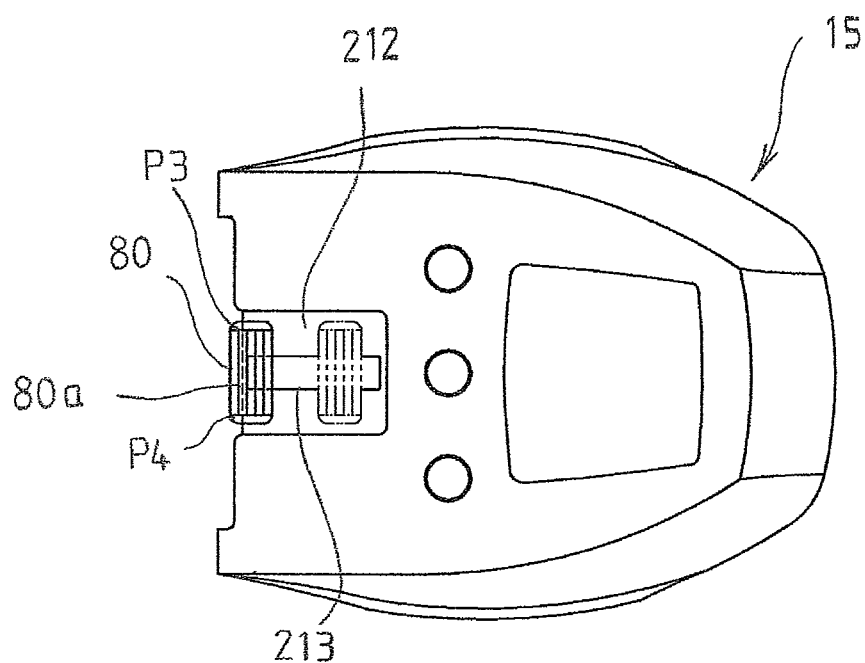
FIG. 28 is a plan view of a control case of an electrically powered reel for fishing according to a third embodiment of the present invention.
Figure 29:
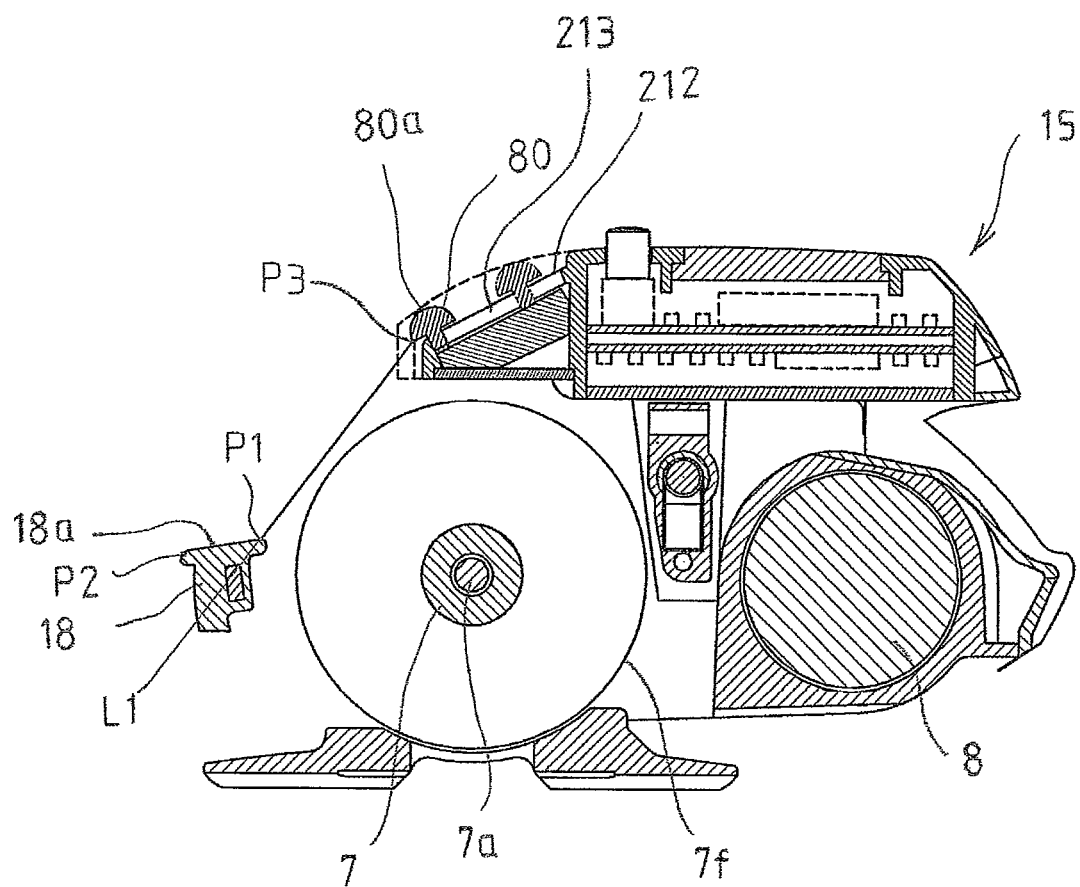
FIG. 29 is a longitudinal sectional view of the electrically powered reel for fishing according to the third embodiment.

FIG. 28 and FIG. 29 are views illustrating a third embodiment of the present invention; FIG. 28 is a plan view of the control case of the electrically powered reel for fishing; and FIG. 29 is a longitudinal sectional view of the electrically powered reel for fishing.

In the rear end side of the control case 15 of this embodiment, an inclined surface 212 is formed which descends toward the rear part, and an operation member 80 is slidably supported along the inclined surface, in a sliding groove 213 which has been formed in the front-rear direction in the center region of the inclined surface 212. In this case, the operation member 80 is structured as a block body which largely extends in the left-right direction than the front-rear direction; the motor power is set at 0 at the lower end position of the inclined surface shown by a solid line of FIG. 28; and the motor power is set so as to increase as the operation member 80 slides and moves toward the front part.

Similarly to the above described embodiment, the reel is structured so that each component member of the main body 5 of the reel does not exist between the operation portion (surface portion 80a) of the operation member 80 and the operation portion of the clutch-OFF switching member 18, specifically, on straight lines which connect the end positions P3 and P4 of the operation member 80 in a state in which the motor power value becomes 0, with the end positions P1 and P2 in the front-rear direction of the center portion of the clutch-OFF switching member 18. (In the figure, a virtual straight line L1 is shown which has connected end position P3 of operation portion 80a with end position P1 of clutch-OFF switching member).

Such a structure as well can show the similar functional effect to that in the above described embodiment; and the operation member 80 can be slid in a state in which the control case 15 are deeply grasped together with the main body of the reel, and accordingly graspability and holdability can be enhanced.

Figure 30:
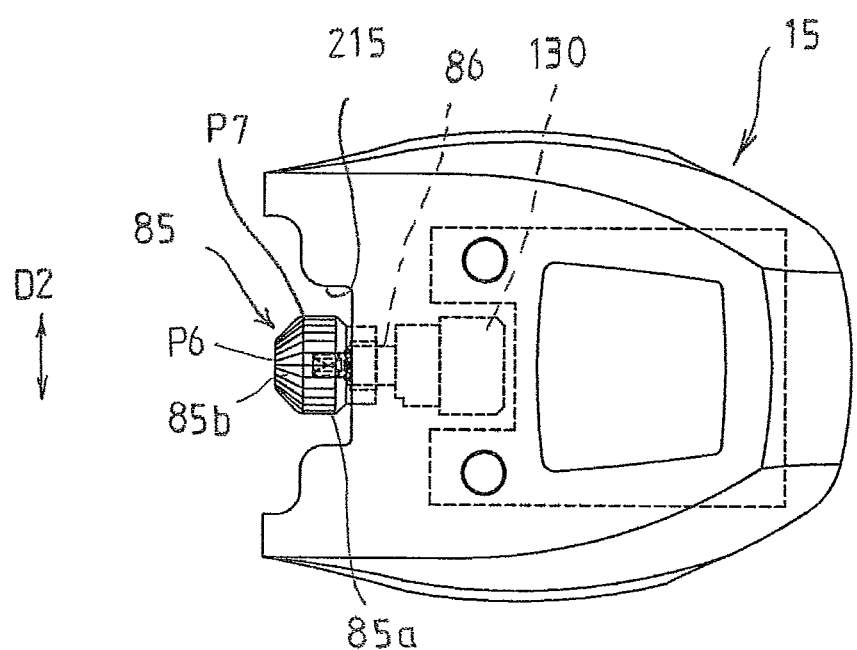
FIG. 30 is a plan view of a control case of an electrically powered reel for fishing according to a fourth embodiment of the present invention.
Figure 31:
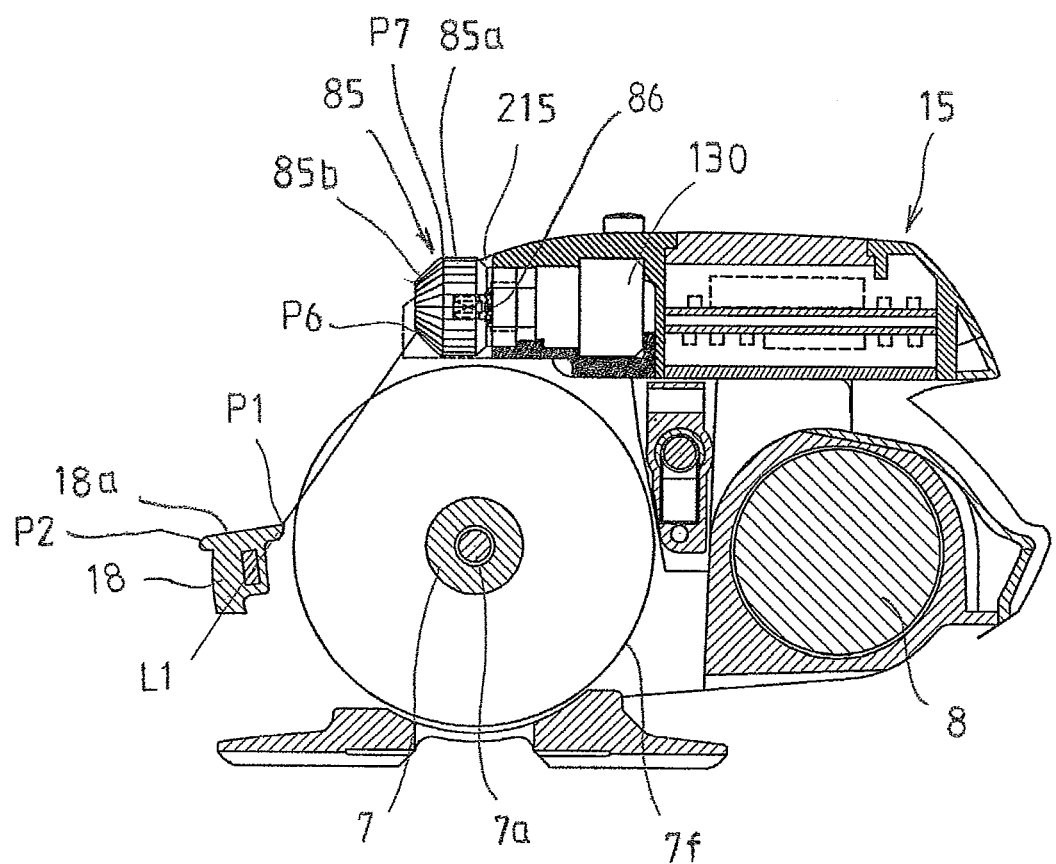
FIG. 31 is a longitudinal sectional view of the electrically powered reel for fishing according to the fourth embodiment.

FIG. 30 and FIG. 31 are views illustrating a fourth embodiment of the present invention; FIG. 30 is a plan view of the control case of the electrically powered reel for fishing; and FIG. 31 is a longitudinal sectional view of the electrically powered reel for fishing.

The control case 15 in this embodiment has the rear end site cut out so as to have a recessed shape, and an operation member 85 having an approximately cylindrical shape is rotatably supported in the center of the central recessed portion 215. In this case, a support shaft 86 of the operation member 85 extends in the front-rear direction and is rotatably supported, and the operation member 85 is rotatably supported in the left-right direction (D2 direction). In the operation member 85 having the approximately cylindrical shape, a cylindrical portion 85a and an approximately conical portion (truncated cone shape) 85b of which the diameter is gradually reduced from the rear end of the cylindrical portion toward the rear part form a rotation-operatable operation portion; the motor power is set at 0 in the position of FIG. 30; and the motor power is set so as to increase by rotation-operating the operation member 85 from here to the left side (may be right side).

Similarly to the above described embodiment, the reel is structured so that each component member of the main body 5 of the reel does not exist between the operation portion of the operation member 85 and the operation portion of the clutch-OFF switching member 18, specifically, on straight lines which connect end positions (tip position P6 of approximately conical portion 85b and rear end position P7 of cylindrical portion 85a) of the operation member 85 in a state in which the motor power value becomes 0, with the end positions P1 and P2 in the front-rear direction of the center portion of the clutch-OFF switching member 18. (In the figure, virtual straight line L1 is shown which has connected end position P6 of operation portion 85a with end position P1 of clutch-OFF switching member.)

Such a structure as well can show the similar functional effect to that in the above described embodiments.

Figure 32:
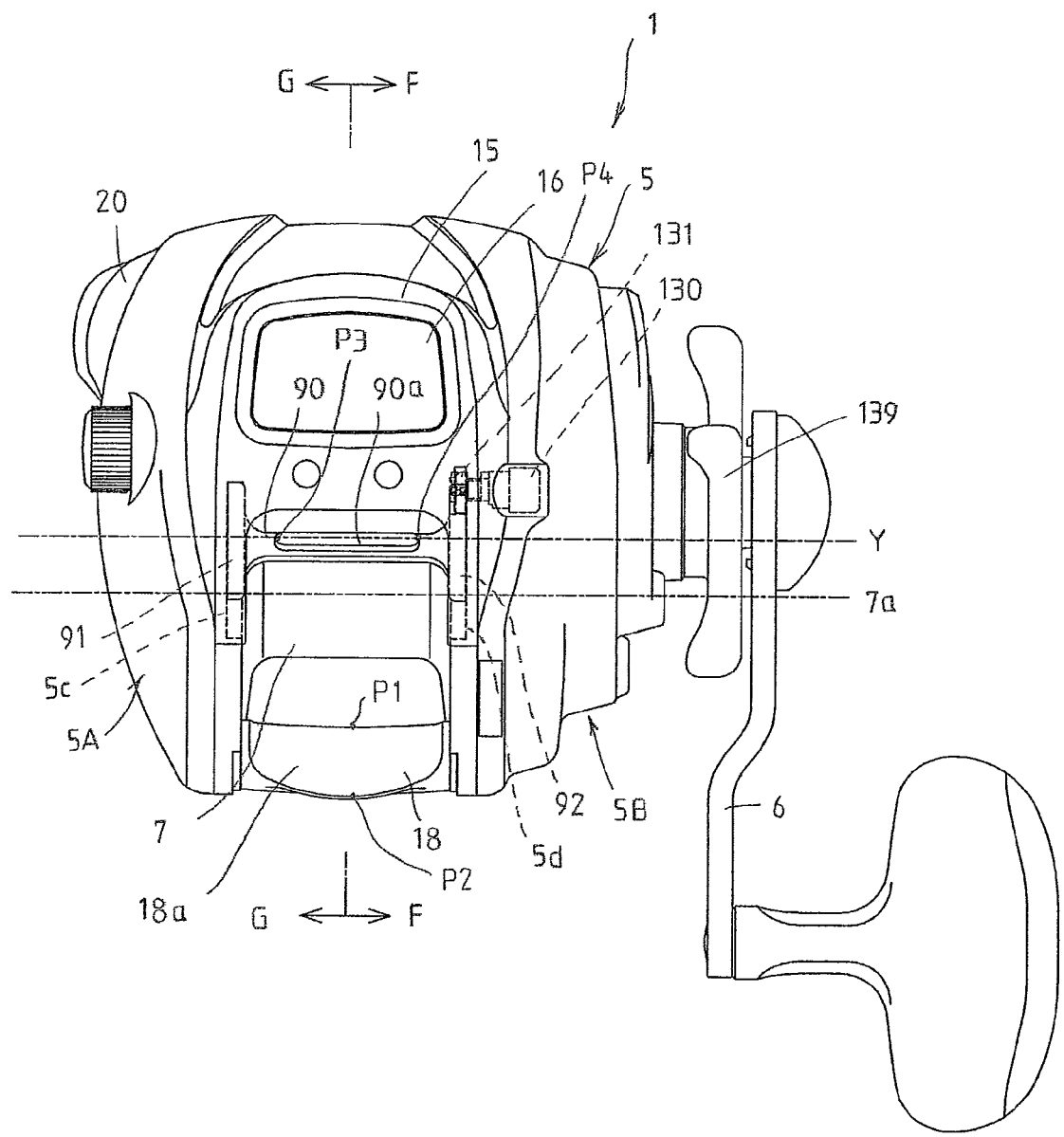
FIG. 32 is a plan view of an electrically powered reel for fishing according to a fifth embodiment of the present invention.
Figure 33:
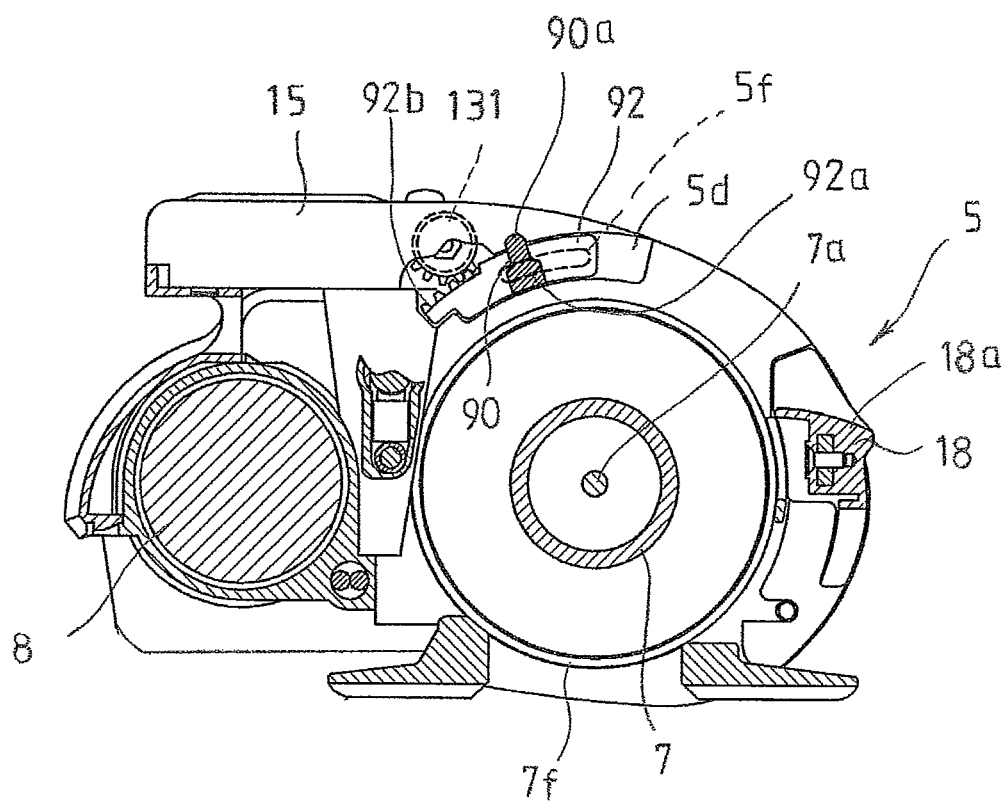
FIG. 33 is a sectional view taken along the line F-F of FIG. 32.
Figure 34:
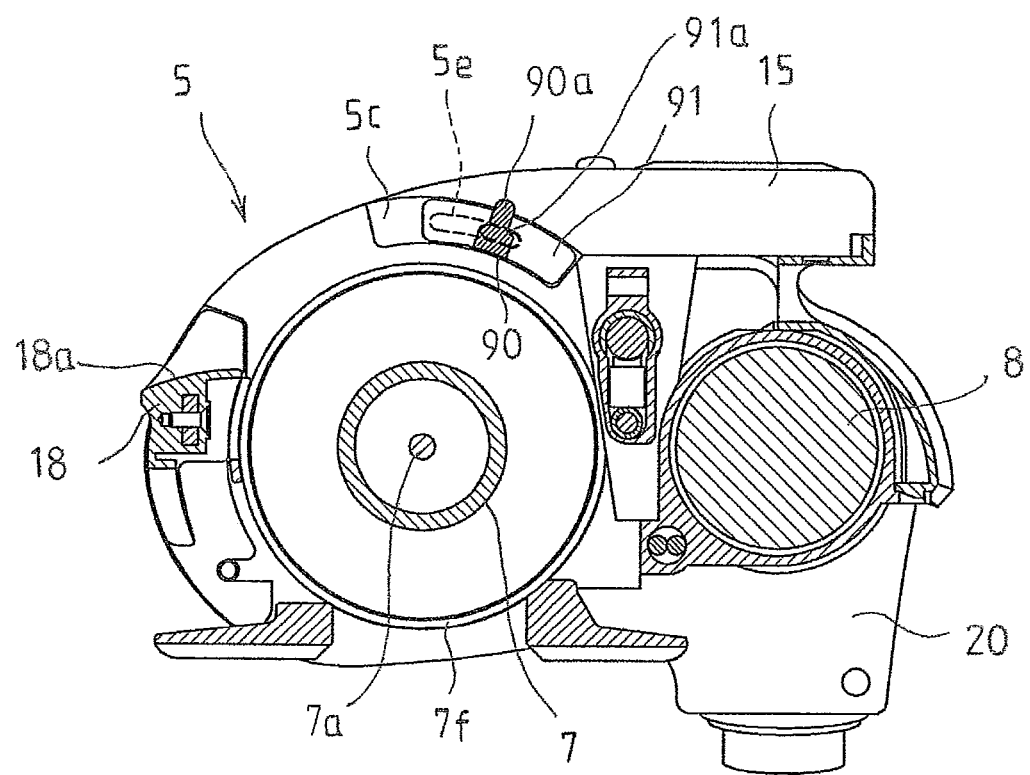
FIG. 34 is a sectional view taken along the line G-G of FIG. 32.
Figure 35:
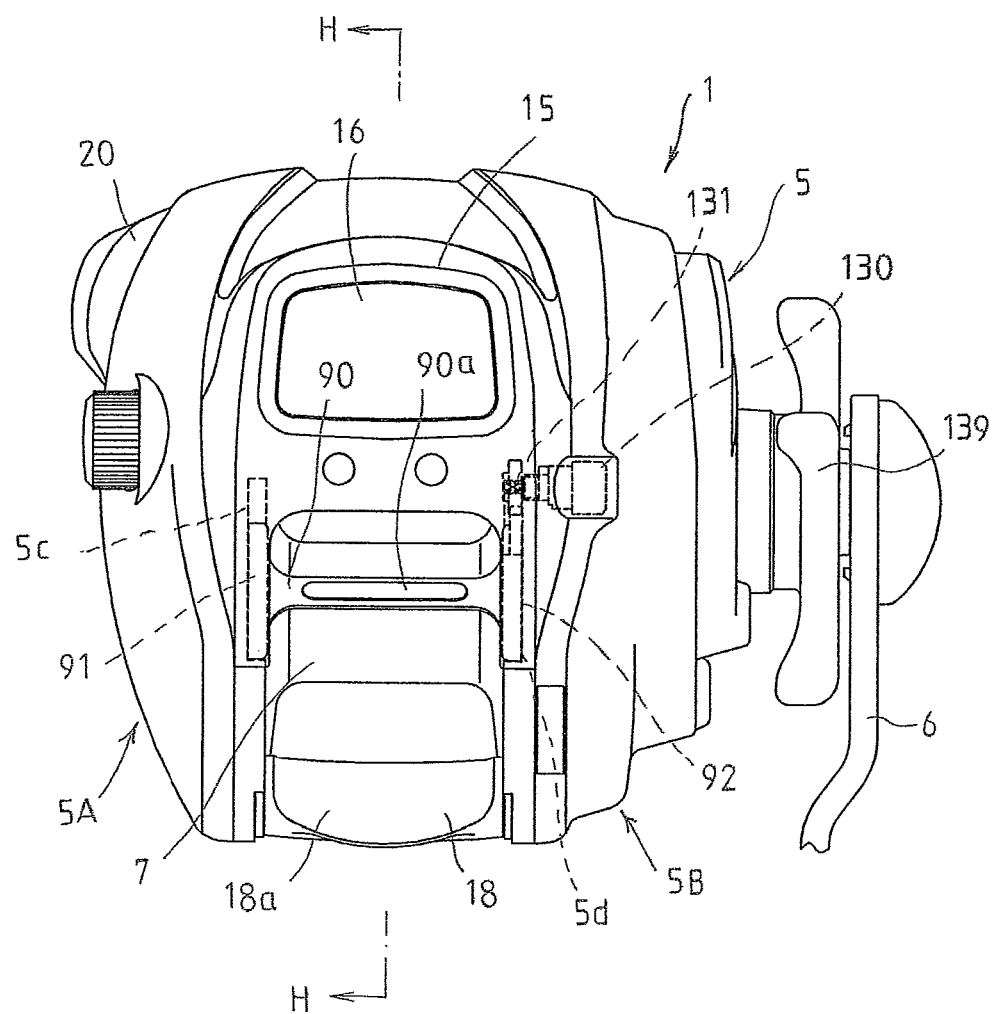
FIG. 35 is a plan view of the electrically powered reel for fishing illustrated in FIG. 5, which illustrates a state in which the operation member has been moved to a rear part.
Figure 36:
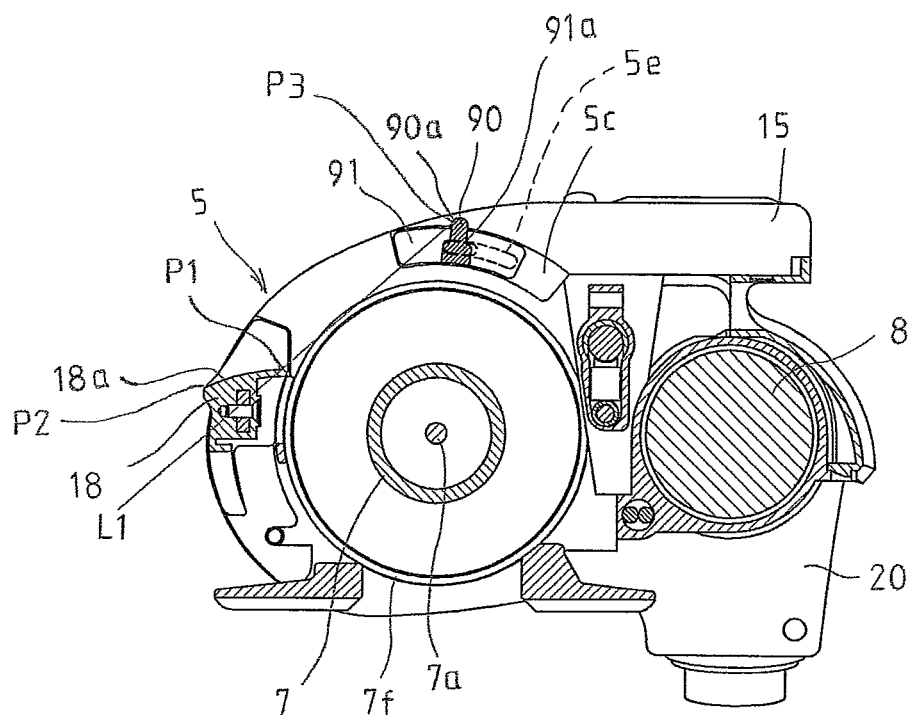
FIG. 36 is a sectional view taken along the line H-H of FIG. 35.
Figure 37:
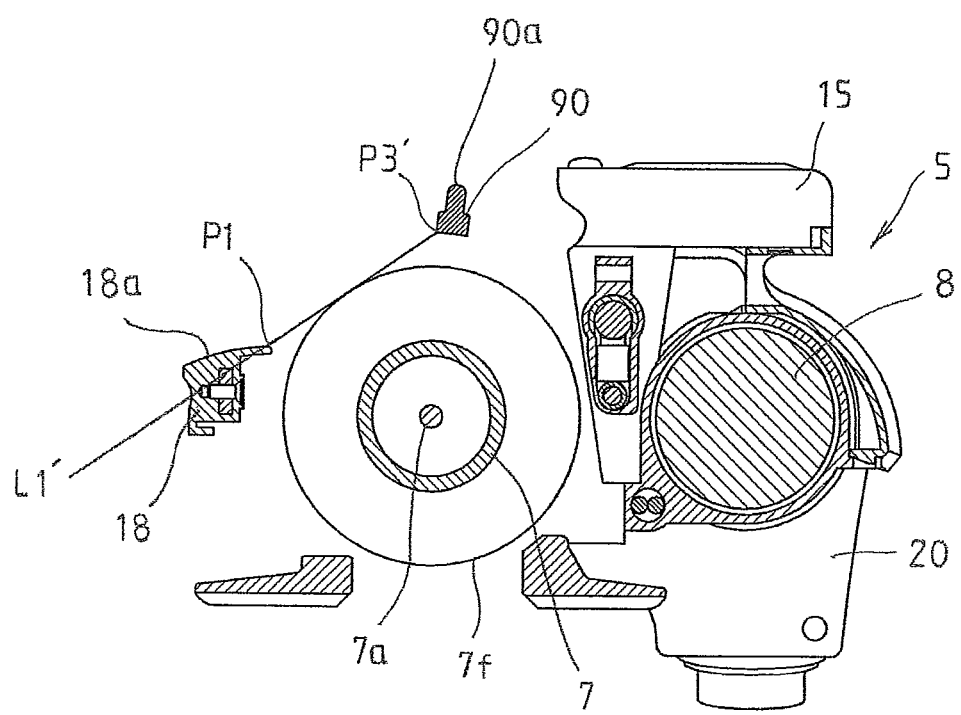
FIG. 37 is a sectional view illustrating a positional relationship between the operation portion of the operation member and the operation portion of a clutch-OFF switching member.

FIG. 32 to FIG. 37 are views illustrating a fifth embodiment of the present invention; FIG. 32 is a plan view of the electrically powered reel for fishing; FIG. 33 is a sectional view taken along the line F-F of FIG. 32; FIG. 34 is a sectional view taken along the line G-G of FIG. 32; FIG. 35 is a plan view illustrating the state in which the operation member has been moved to a rear part; FIG. 36 is a sectional view taken along the line H-H of FIG. 35; and FIG. 37 is a sectional view illustrating a positional relationship between the operation portion of the operation member and the operation portion of a clutch-OFF switching member.

In this embodiment, an operation member 90 is installed so as to be laterally bridged between the left and right side plates 5A and 5B in the rear end side of the control case 15. The operation portion 90a of the operation member 90 is supported so as to rotate in the front-rear direction, in the more front side than the spool shaft 7a of a spool 7, and the position (shown by Y) of the operation portion 90a becomes a more front part than the spool shaft 7a, at the position illustrated in FIG. 32, at which the motor power becomes maximum. In addition, the operation member 90 is rotatably supported along an arc of which the center is the spool shaft 7a (is rotatably supported so as to form an arc shape within a predetermined range in the diameter direction from the outer end of the flange 7f of the spool 7).

For this reason, recessed portions 5c and 5d having the approximately arc shapes are formed on each of the side plates 5A and 5B, and movable bodies 91 and 92 which are formed integrally with the above described operation member 90 are accommodated in the recessed portions 5c and 5d. Locking portions 91a and 92a are formed in the movable bodies 91 and 92, respectively, and are engaged with grooves 5e and 5f which have arc shapes and are formed in the above described recessed portions 5c and 5d. In addition, a rack 92b is formed in one movable body 92, and a pinion 131 on which the angle sensor 130 is mounted is engaged with this rack.

In addition, in the above described structure, the operation portion 90a which is laterally bridged between the left and right side plates is rotatably supported by movable bodies 91 and 92 that can slide in side plates 5A and 5B; also a motor power is set at 0, at a position at which the operation portion 90a rotates and moves to the most rear side: and the motor power is set so as to increase as the operation portion 90a slides and moves to the front part. (FIG. 32 to FIG. 34 illustrate a position at which the motor power becomes maximum.)

Similarly to the above described embodiment, the reel is structured so that each component member of the main body 5 of the reel does not exist between the operation portion of the operation member 90 and the operation portion of the clutch-OFF switching member 18, specifically, on straight lines which connect the end positions P3 and P4 of the operation member 90 in a state in which the motor power value becomes 0, with the end positions P1 and P2 in the front-rear direction of the center portion of the clutch-OFF switching member 18. In addition, in FIG. 36, a virtual straight line L1 is shown which has connected the end position P3 of the operation portion 90a with the end position P1 of the clutch-OFF switching member, and in FIG. 37, a virtual straight line L1' is shown which has connected an end position P3' of the operation portion 90a with the end position P1 of the clutch-OFF switching member. (In any case, a component member does not exist on the virtual straight line).

Such a structure as well can show the similar functional effect to that in the above described embodiments. In addition, the operation portion 90a of the operation member 90 of the present embodiment is structured so as to be rotatable in a more front part than a spool shaft 7a of a spool 7, accordingly it becomes possible to widely secure a space for a thumbing operation, an operation is facilitated, and furthermore the restoration is facilitated when thread tangling or backlash has occurred. Furthermore, the operation portion 90a moves along an trajectory similar to a curvature of a reel face of the spool, and accordingly a series of operations from the thumbing operation to an operation of driving the motor can be smoothly performed with an excellent operation feeling even when a fishing rod and the main body of the reel are grasped by a single hand in such a state that the fishing rod is supported by hand.

Figure 38:
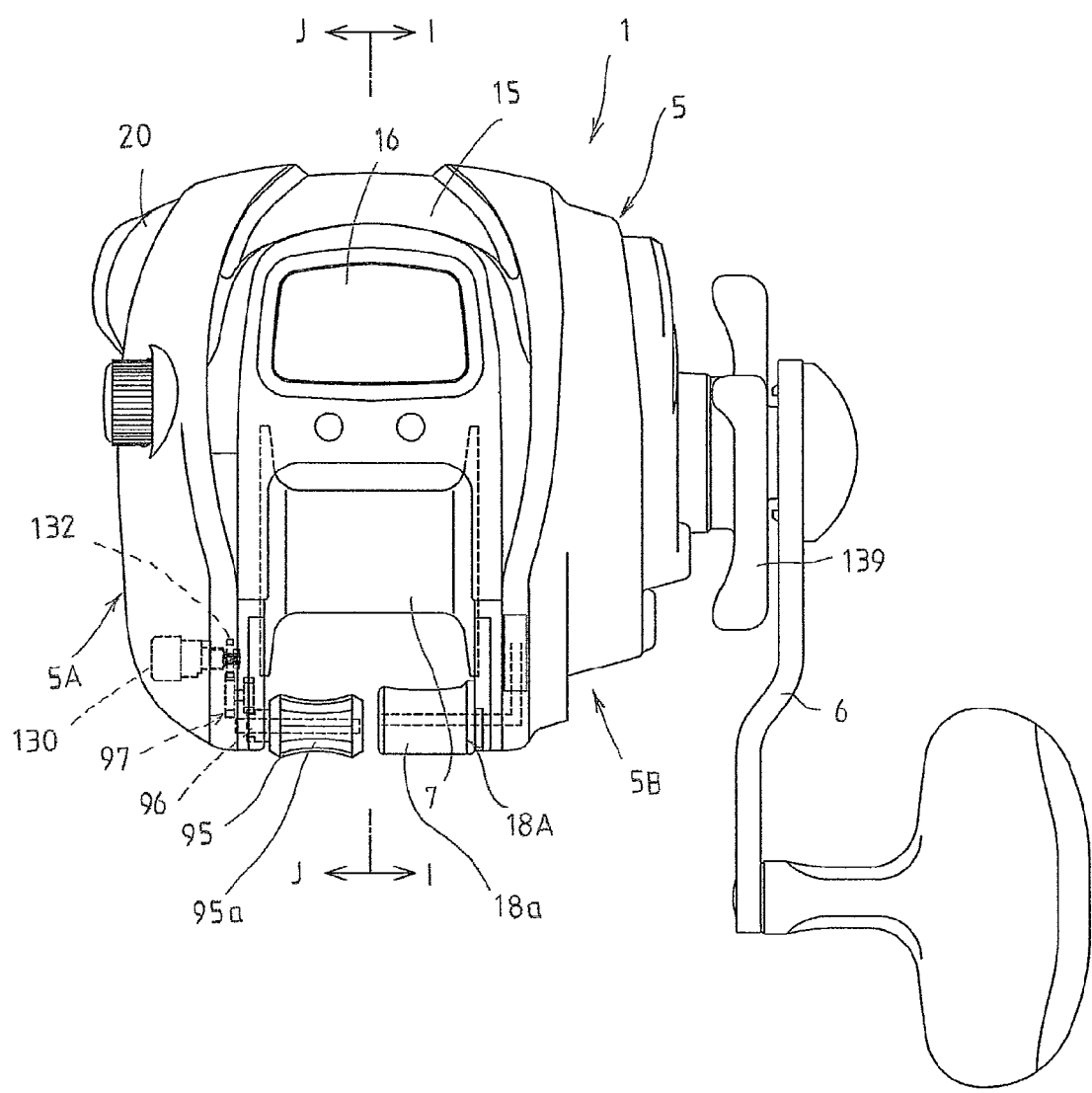
FIG. 38 is a plan view of an electrically powered reel for fishing according to a sixth embodiment of the present invention.
Figure 39:
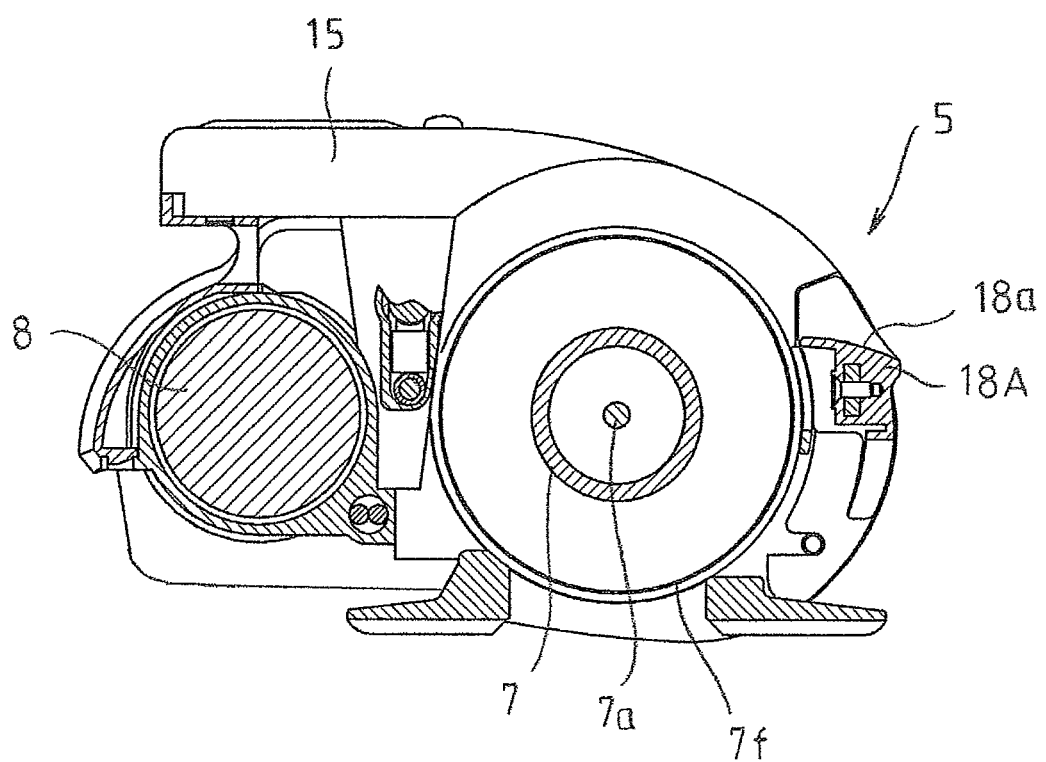
FIG. 39 is a sectional view taken along the line I-I of FIG. 38.
Figure 40:
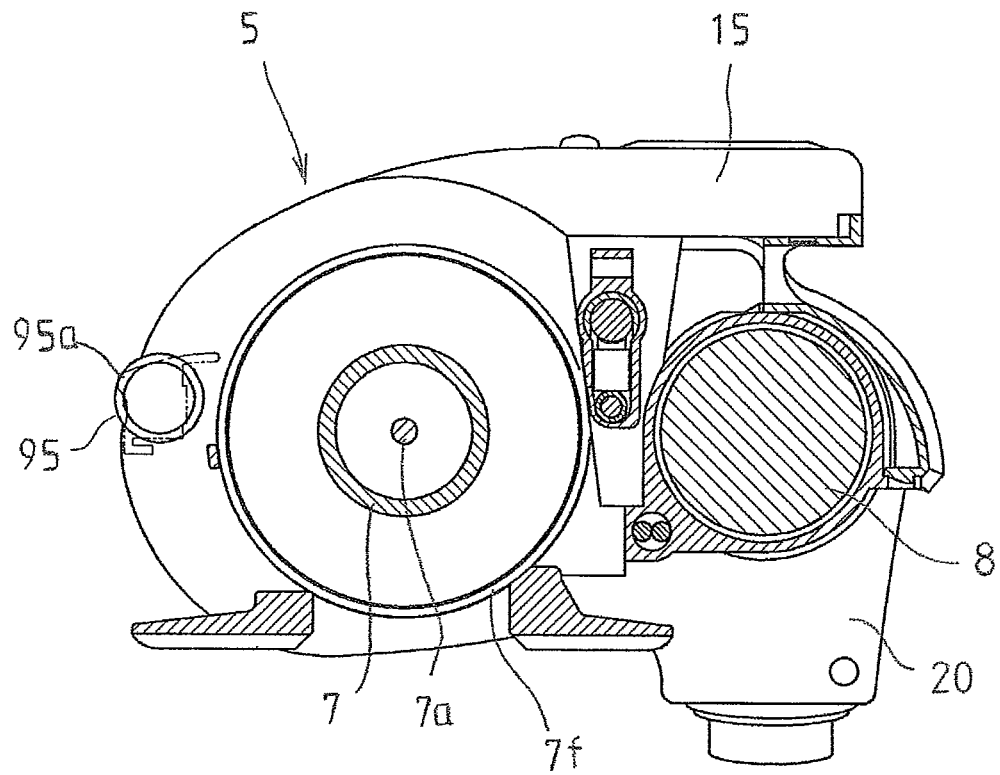
FIG. 40 is a sectional view taken along the line H of FIG. 38.

FIG. 38 to FIG. 40 views illustrating a sixth embodiment of the present invention; FIG. 38 is a plain view of the electrically powered reel for fishing; FIG. 39 is a cross-sectional view taken along the line I-I of FIG. 38; and FIG. 40 is a cross-sectional view taken along the line J-J of FIG. 38.

In this embodiment, an operation member 95 which adjusts the power of the motor and a clutch-OFF switching member 18A are distributed and installed between left and right side plates 5A and 5B, in parallel. In other words, the operation member 95 is structured into a cylindrical shape and is installed so as to initiate from an inner face of the left side plate 5A and terminate at the center portion, and the clutch-OFF switching member 18A is installed so as to initiate from an inner face of the right side plate 5B and terminate at the center portion. (Both tips do not abut on each other and the members are installed in parallel.)

In this case, the operation member 95 is rotatably supported, a gear train 97 is installed in the end side of the support shaft 96, and a gear 132 which is mounted on an angle sensor 130 is engaged with the gear train 97.

When the operation member 95 and the clutch-OFF switching member 18A are structured in this way, each component member of the main body 5 of the reel results in not existing between both of the members, and the virtual straight line which is defined as having been described above fits between the left and right side plates. Accordingly, the similar functional effect to that in the above described embodiments can be obtained and the graspability and holdability are also enhanced. Particularly, by approximately equalizing the height of an upper face of the operation portion 95a of the operation member 95 to the height of an operation portion 18a of the clutch-OFF switching member 18A, the operator only needs to slide the thumb which abuts on the operation member in a transverse direction, when the operator moves a finger from the operation member 95 to the clutch-OFF switching member 18A in the sounding operation as described above, and accordingly the operator can smoothly and quickly perform an operation of dropping the fishing tackle from a state of having wound the fishing line.

For information, the operation member 95 does not need to be rotation-operated but may have such a structure that the operation member rotates and moves or linearly moves along the inner face of the left side plate.

The electrically powered reel for fishing as illustrated above can be applied to a hand-holdable type (small type) of electrically powered reel with which the operator can perform various operations while grasping and holding the main body of the reel by a single hand together with the fishing rod, as illustrated in FIG. 41. Of course, the electrically powered reel for fishing may also be applied to a medium-sized type to large-sized type of electrically powered reels with which the operator perform various operations while grasping the fishing rod by a single hand and grasping and holding the main body of the reel by the other hand, as illustrated in FIG. 42.

As described above, the embodiment of the present invention has been described, but if a component member of the reel (except for fishing line) is not arranged on the virtual straight line, when the operation portion of the operation member which adjusts the power of the drive motor and the operation portion of the clutch-OFF switching member are connected with the virtual shortest straight line, it is possible to appropriately modify an installation position, an installation method, an operation direction and the like of the operation member and the clutch-OFF switching member. In the structure illustrated in Figure, both members are installed so as to be positioned between the left and right side plates, but may be installed in any one side of the side plates.

1 Electrically powered reel for fishing;
5 Main body of reel
5A and 5B Left and right side plates
6 Manual handle
7 Spool
7a Spool shaft
7f Flange
8 Drive motor
15 Control case
17 Clutch mechanism
18 Clutch-OFF switching member
18a Operation portion
19 Clutch-ON switching member
25, 55, 60, 75, 80, 85 and 90 Operation member
FIG. 1
1 FRONT
2 REAR
3 LEFT

4 RIGHT
FIG. 2
1 FRONT
2 REAR
3 UPPER
4 LOWER
FIG. 12
115 I/O PORT
170 MOTOR DRIVE CIRCUIT
160 DISPLAY CONTROL CIRCUIT
130 ANGLE SENSOR
16a and 16b OPERATION BUTTON
140 THREAD LENGTH MEASURING DEVICE
8 DRIVE MOTOR
16 LIQUID CRYSTAL DISPLAY SECTION
25 OPERATION MEMBER
7 SPOOL

What is claimed is:

1. An electrically powered reel for fishing comprising:
a spool which is provided between left and right side plates of a main body of the reel, and around which a fishing line is wound;
a drive motor which is provided in the main body of the reel and rotates and drives the spool;
an operation member which adjusts a power of the drive motor;
a clutch-OFF switching member which switches and operates the spool to a free rotation state from a fishing line winding state, and
a control case for controlling the drive motor, the control case being arranged between the left and right side plates, the control case comprising a display, and the control case comprising an opening region formed to expose the spool from the control case, wherein
the operation member is arranged between the left and right side plates in the rear side of the display, the operation member being supported between the left and right side plates so as to face the opening region of the control case, and
each component member of the reel is arranged so as to avoid a virtual straight line drawn to extend between an operation portion of the operation member and an operation portion of the clutch-OFF switching member.

2. The electrically powered reel for fishing according to claim 1, wherein the main body of the reel is structured so that the virtual straight line is drawn between the left and right side plates.

3. The electrically powered reel for fishing according to claim 1, wherein the spool is installed so that the virtual straight line is drawn within a range of ±10% with respect to an outside diameter of a flange of the spool when the spool is viewed from an axial direction.

4. The electrically powered reel for fishing according to claim 1, wherein the operation member and the clutch-OFF switching member are installed so that an operation movement direction of the operation member is approximately parallel to a straight line obtained by connecting a center of the operation portion of the operation member with a center of the operation portion of the clutch-OFF switching member, when the main body of the reel is viewed from an upper surface.

5. The electrically powered reel for fishing according to claim 1, wherein the operation member is installed so that a direction closer to the clutch-OFF switching member corresponds to a low-speed driving side of the drive motor.

6. The electrically powered reel for fishing according to claim 1, wherein, when viewed from behind the clutch-OFF switching member, the clutch-OFF switching member is arranged behind the spool and between the left and right side plates of the main body of the reel, and is formed so that a center of an operation face thereof is arranged at a lowest position.

7. The electrically powered reel for fishing according to claim 1, wherein the operation member and the clutch-OFF switching member are installed so that each center position is in an upper part of a portion to be attached to a fishing rod of the main body of the reel and in a range of a width of the fishing rod in a left-right direction when the reel is viewed from a rear part.

8. The electrically powered reel for fishing according to claim 1, wherein the operation member is structured to be an approximately cylindrical shape and is rotatably supported with respect to the main body of the reel.

* * * * *